US012790535B2

(12) United States Patent
Harada et al.

(10) Patent No.: US 12,790,535 B2
(45) Date of Patent: Nov. 10, 2026

(54) COMPOSITION AND DISPLAY DEVICE

(71) Applicant: SUMITOMO CHEMICAL COMPANY, LIMITED, Tokyo (JP)

(72) Inventors: Yoshihiro Harada, Osaka (JP); Yoshifumi Komatsu, Osaka (JP); Masayoshi Tokuda, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 1204 days.

(21) Appl. No.: 17/780,457

(22) PCT Filed: Dec. 23, 2020

(86) PCT No.: PCT/JP2020/048161
§ 371 (c)(1),
(2) Date: May 26, 2022

(87) PCT Pub. No.: WO2021/132332
PCT Pub. Date: Jul. 1, 2021

(65) Prior Publication Data

US 2023/0013986 A1 Jan. 19, 2023

(30) Foreign Application Priority Data

Dec. 26, 2019 (JP) ................................ 2019-236576

(51) Int. Cl.

| | |
|---|---|
| ***C09K 11/02*** | (2006.01) |
| ***C08F 220/06*** | (2006.01) |
| ***C08F 220/18*** | (2006.01) |
| ***C08F 220/38*** | (2006.01) |
| ***C08K 9/02*** | (2006.01) |
| ***C09K 11/08*** | (2006.01) |
| ***C09K 11/88*** | (2006.01) |
| *B82Y 20/00* | (2011.01) |

(52) U.S. Cl.
CPC ............ *C09K 11/02* (2013.01); *C08F 220/06* (2013.01); *C08F 220/1807* (2020.02); *C08K 9/02* (2013.01); *C09K 11/0883* (2013.01); *C09K 11/883* (2013.01); *B82Y 20/00* (2013.01); *C08F 2800/20* (2013.01); *C08F 2810/50* (2013.01); *C08K 2201/011* (2013.01)

(58) Field of Classification Search
CPC ....... C09K 11/02; C09K 11/025; C09K 11/70; C09K 11/0883; C09K 11/883; C09D 201/08; C09D 201/02; C08L 101/02; C08L 101/08; C08F 290/126; C08F 220/38; B82Y 20/00
See application file for complete search history.

(56) References Cited

U.S. PATENT DOCUMENTS

| | | | | |
|---|---|---|---|---|
| 5,281,449 | A | 1/1994 | Iwasawa et al. | |
| 2011/0053091 | A1 | 3/2011 | Hiroi et al. | |
| 2015/0037588 | A1 | 2/2015 | Kato | |
| 2017/0052444 | A1 | 2/2017 | Park et al. | |
| 2017/0059988 | A1 | 3/2017 | Paek et al. | |
| 2017/0183567 | A1* | 6/2017 | Zhou ........................ | G03F 7/027 |
| 2019/0211266 | A1* | 7/2019 | Hirayama .............. | C09K 11/02 |
| 2021/0040383 | A1 | 2/2021 | Yahata et al. | |

FOREIGN PATENT DOCUMENTS

| | | | | |
|---|---|---|---|---|
| CN | 106569389 | A | 4/2017 | |
| CN | 106795228 | A | 5/2017 | |
| CN | 109997079 | A | 7/2019 | |
| CN | 110964528 | A | 4/2020 | |
| JP | 2006-290999 | A | 10/2006 | |
| JP | 2013-033276 | A | 2/2013 | |
| JP | 2013-064989 | A | 4/2013 | |
| JP | 2013-203955 | A | 10/2013 | |
| JP | 2016-065178 | A | 4/2016 | |
| JP | 2016-157118 | A | 9/2016 | |
| JP | 2018-123274 | A | 8/2018 | |
| JP | 2018-131612 | A | 8/2018 | |
| JP | 2018-131614 | A | 8/2018 | |
| JP | 2019-081863 | A | 5/2019 | |
| JP | 2019-139240 | A | 8/2019 | |
| JP | 2019-537064 | A | 12/2019 | |
| KR | 20170022951 | A | 3/2017 | |
| KR | 10-2017-0043084 | A | 4/2017 | |
| TW | 201829726 | A | 8/2018 | |
| TW | 201923464 | A | 6/2019 | |
| WO | WO-2016/035602 | A1 | 3/2016 | |
| WO | WO-2016/035603 | A1 | 3/2016 | |
| WO | WO-2018/093028 | A1 | 5/2018 | |
| WO | WO-2019189495 | A1 * | 10/2019 | ............... G02B 5/20 |

OTHER PUBLICATIONS

Machine translation of WO-2019189495-A1. (Year: 2019).*
Office Action, dated Aug. 8, 2023, issued in corresponding Japanese Patent Application No. 2019-236576 (7 pages).
International Searching Authority, "International Search Report," issued in connection with International Patent Application No. PCT/JP2020/048161, dated Feb. 9, 2021.
International Searching Authority, "Written Opinion," issued in connection with International Patent Application No. PCT/JP2020/048161, dated Feb. 9, 2021.
Office Action issued in corresponding Chinese Patent Application No. 202080089604. 1 dated Mar. 8, 2024 (9 pages).
Office Action issued in corresponding Taiwanese Patent Application No. 109145378 dated Feb. 6, 2024 (8 pages).
Office Action issued in corresponding Japanese Patent Application No. 2019-236576, dated Jun. 6, 2023.
Office Action issued in corresponding Taiwanese Patent Application No. 109145393 dated Apr. 24, 2024 (21 pages).
European Extended Search Report issued in corresponding European Patent Application No. 20906816.2 dated Jan. 4, 2024 (6 pages).

(Continued)

*Primary Examiner* — Matthew E. Hoban
*Assistant Examiner* — Lynne Edmondson
(74) *Attorney, Agent, or Firm* — Foley & Lardner LLP

(57) ABSTRACT

A composition contains quantum dots (A) and a resin (B), wherein the resin (B) contains a polymer (B1) having a sulfide group, a carboxyl group, and an unsaturated double bond.

8 Claims, No Drawings

(56) References Cited

OTHER PUBLICATIONS

European Extended Search Report issued in corresponding European Patent Application No. 20906859.2 dated Jan. 4, 2024 (6 pages).
Office Action issued in corresponding Chinese Patent Application No. 202080089807.0 dated Dec. 25, 2023 (27 pages).
International Searching Authority, "International Search Report," issued in connection with International Patent Application No. PCT/JP2020/048160, dated Mar. 16, 2021.
International Searching Authority, "Written Opinion," issued in connection with International Patent Application No. PCT/JP2020/048160, dated Mar. 16, 2021.
Translation of International Searching Authority, "Written Opinion," issued in connection with International Patent Application No. PCT/JP2020/048161, dated Feb. 9, 2021.
Office Action issued in corresponding Japanese Patent Application No. 2019-236576 dated Sep. 26, 2023 (7 pages).
Office Action issued in corresponding Chinese Patent Application No. 202080089604.1 dated Jun. 17, 2024 (10 pages).

* cited by examiner

COMPOSITION AND DISPLAY DEVICE

CROSS-REFERENCE TO RELATED APPLICATIONS

The present application claims priority under 37 U.S.C. § 371 to International Patent Application No. PCT/JP2020/048161, filed Dec. 23, 2020, which claims priority to and the benefit of Japanese Patent Application No. 2019-236576, filed on Dec. 26, 2019. The contents of these applications are hereby incorporated by reference in their entireties.

TECHNICAL FIELD

The present invention relates to a composition and further relates to a display device.

BACKGROUND ART

Patent Literature 1 proposes a curable resin composition comprising a polymer having a structural moiety represented by the following general formula and quantum dots:

[Formula 1]

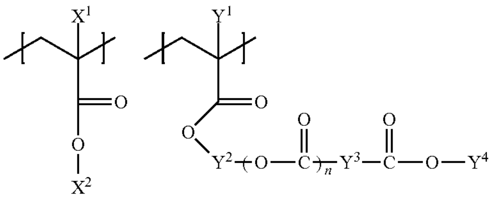

CITATION LIST

Patent Literature

Patent Literature 1: Japanese Patent Laid-Open No. 2016-65178

SUMMARY OF INVENTION

Technical Problem

In the curable resin composition containing quantum dots disclosed in Patent Literature 1, the brightness is not sufficiently maintained in the process of preparing the cured film, and residue is sometimes generated during development. In addition, a hard coat layer or a colored layer may be formed on a film containing a cured product of a curable resin composition containing quantum dots using a composition for forming a hard coat layer or a composition for forming a coloring layer containing an organic solvent, and solvent resistance after curing is also required.

An object of the present invention is to provide a composition which maintains brightness in the process of preparing a cured film, reduces residue during development, and exhibits excellent solvent resistance after curing.

Solution to Problem

The present invention provides a composition and a display device described below.

[1] A composition comprising: quantum dots (A); and a resin (B), wherein the resin (B) comprises a polymer (B1) having a sulfide group, a carboxy group, and an unsaturated double bond.

[2] The composition according to [1], wherein the polymer (B1) is a polymer having a structural unit derived from a monomer (a) having a mercapto group and a carboxy group, a monomer (b) which is at least one selected from the group consisting of an unsaturated carboxylic acid and an unsaturated carboxylic acid anhydride, and a monomer (c) having an oxiranyl group and an ethylenically unsaturated bond.

[3] The composition according to [2], wherein the monomer having a mercapto group and a carboxy group comprises a compound represented by the general formula (1):

[Formula 2]

(1)

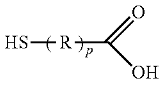

wherein

R represents a hydrocarbon group; a plurality of R, when present, are optionally the same as or different from each other; the hydrocarbon group optionally has one or more substituents; a plurality of substituents, when present, are optionally the same or different, and are optionally bonded to each other to form a ring together with the atoms to which they are bonded; $-CH_2-$ contained in the hydrocarbon group is optionally replaced by at least one of $-O-$, $-CO-$, and $-NH-$; and p represents an integer of 1 to 10.

[4] The composition according to [2] or [3], wherein the monomer (c) having an oxiranyl group and an ethylenically unsaturated bond comprises at least one of a monomer (c1) having a structure obtained by epoxidizing an unsaturated chain aliphatic hydrocarbon and an ethylenically unsaturated bond and a monomer (c2) having a structure obtained by epoxidizing an unsaturated alicyclic hydrocarbon and an ethylenically unsaturated bond.

[5] The composition according to any one of [1] to [4], wherein the polymer (B1) has a structural unit represented by the general formulas (ba), (bb), and (bc):

[Formula 3]

(ba)

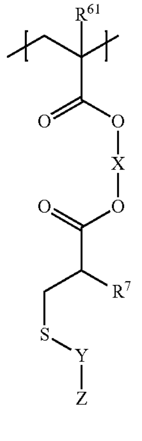

-continued (bb)

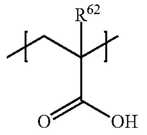

(bc)

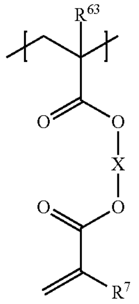

wherein $R^{61}$, $R^{62}$, and $R^{63}$ independently represent a hydrogen atom or a methyl group;

$R^7$ represents a hydrogen atom or an alkyl group having 1 to 4 carbon atoms, and a hydrogen atom contained in the alkyl group is optionally replaced by a hydroxy group;

X represents *—$R^8$—$X^3$—, *—$R^8$—O—$X^3$—, *—$R^8$—S—$X^3$—, or *—$R^8$—NH—$X^3$—; * represents a bond to an oxygen atom on a $R^7$ side; $R^8$ represents an alkanediyl group having 1 to 6 carbon atoms; $X^3$ represents an ethylene group or a divalent alicyclic hydrocarbon group, which has a hydroxy group;

Y represents —(R)p-; R represents a hydrocarbon group; a plurality of R, when present, are optionally the same as or different from each other; the hydrocarbon group optionally has one or more substituents; a plurality of substituents, when present, are optionally the same or different, and are optionally bonded to each other to form a ring together with the atoms to which they are bonded; —$CH_2$— contained in the hydrocarbon group is optionally replaced by at least one of —O—, —CO—, and —NH—;  represents a bond to S; p represents an integer of 1 to 10; and Z represents a carboxy group.

[6] The composition according to any one of [1] to [5], further comprising a polymerizable compound (C) and a polymerization initiator (D).

[7] A cured film formed from the composition according to any one of [1] to [6].

[8] A display device comprising the cured film according to [7].

[9] A resin having a sulfide group, a carboxy group, and an unsaturated double bond.

Advantageous Effects of Invention

According to the present invention, it is possible to provide a composition which maintains brightness during the process, reduces residue during development, and exhibits excellent solvent resistance after curing.

DESCRIPTION OF EMBODIMENTS

<Composition>

A composition of the present invention comprises quantum dots (A) and resin (B). The composition of the present invention may further contain at least one selected from the group consisting of a photopolymerizable compound (C), a photopolymerization initiator (D), an antioxidant (E), a leveling agent (F), a solvent (G), and a light scattering agent (H) described later. The composition of the present invention preferably further contains a polymerizable compound (C) and a polymerization initiator (D).

[1] Quantum Dots (A)

The quantum dots (A) are semiconductor fine particles having a particle size of 1 nm or more and 100 nm or less and absorb ultraviolet light or visible light and emit light by utilizing a band gap of the semiconductor.

Examples of the quantum dots (A) include compounds of Group 12 element and Group 16 element such as CdS, CdSe, CdTe, ZnS, ZnSe, ZnTe, HgS, HgSe, HgTe, CdHgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe; compounds of Group 13 element and Group 15 element such as GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs and InAlPAs; compounds of Group 14 element and Group 16 element such as PdS and PbSe.

When the quantum dots (A) contain S or Se, the quantum dots surface-modified with a metal oxide or an organic substance may be used. By using the surface-modified quantum dots, it is possible to prevent S or Se from being extracted by a reaction component in the material forming the organic layer.

Further, the quantum dots (A) may form a core-shell structure by combining the above compounds. Examples of such a combination include fine particles having a core of CdSe and a shell of ZnS.

Since the energy state of the quantum dots (A) depends on its size, the emission wavelength can be freely selected by changing the particle size. For example, in the case of quantum dots composed of only CdSe, the peak wavelengths of the fluorescence spectrum when the particle sizes are 2.3 nm, 3.0 nm, 3.8 nm, and 4.6 nm are 528 nm, 570 nm, 592 nm, and 637 nm, respectively. The light emitted from the quantum dots (A) has a narrow spectral width, and by combining light having such a steep peak, the displayable color gamut of the display device is expanded. Further, the quantum dots (A) have high responsiveness, and can efficiently utilize light emitted from a light source.

The composition of the present invention may contain only quantum dots that emit light having a specific wavelength in response to light emitted from a light source, or may contain two or more kinds of quantum dots that emit light having different wavelengths in combination. Examples of the light having a specific wavelength include red light, green light, and blue light.

The content ratio of the quantum dots (A) may be, for example, based on the total amount of the solid content of the composition, 0.1% by mass or more and 60% by mass or less, preferably 5% by mass or more and 50% by mass or less, and more preferably 20% by mass or more and 45% by mass or less. As used herein, the total amount of the solid content means the total of the composition components excluding the solvent (G) described later. The content ratio of the composition in the solid content can be measured by a known analytical means such as liquid chromatography or gas chromatography.

[2] Resin (B)

The resin (B) contains a polymer (B1) having a sulfide group (—S—), a carboxy group (—C(═O)OH), and an unsaturated double bond (═C). Since the resin (B) contains the polymer (B1), it is possible to maintain brightness during the process, reduce residue during development, and exhibit excellent solvent resistance after curing.

The polymer (B1) may be a polymer having a structural unit derived from a monomer (a) (hereinafter sometimes referred to as “(a)”) having a mercapto group (—SH) and a carboxy group, a monomer (b) (hereinafter sometimes referred to as “(b)”) which is at least one selected from the group consisting of an unsaturated carboxylic acid and an unsaturated carboxylic acid anhydride, and a monomer (c) (hereinafter sometimes referred to as “(c)”) having an oxiranyl group and an ethylenically unsaturated bond.

Examples of (a) include a carboxylic acid having a mercapto group and an anhydride thereof. Examples of the carboxylic acid having a mercapto group include a compound represented by the following general formula (1):

[Formula 4]

(1)

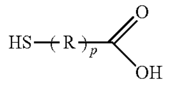

[In the formula,

R represents a hydrocarbon group; a plurality of R, when present, are optionally the same as or different from each other; the hydrocarbon group may have one or more substituents; a plurality of substituents, when present, are optionally the same or different, and are optionally bonded to each other to form a ring together with the atoms to which they are bonded; —$CH_2$— contained in the hydrocarbon group is optionally replaced by at least one of —O—, —CO—, and —NH—;

p represents an integer of 1 to 10.]

Examples of the hydrocarbon group in R include a chain hydrocarbon group, an alicyclic hydrocarbon group, and an aromatic hydrocarbon group.

The chain hydrocarbon group may be, for example, a linear or branched alkanediyl group, and the number of carbon atoms thereof is usually 1 to 50, preferably 1 to 20, and more preferably 1 to 10. Examples of the linear or branched alkanediyl group include a propane-1,2-diyl group, a propane-1,3-diyl group, a butane-1,4-diyl group, and a pentane-1,5-diyl group, a hexane-1,6-diyl group, a heptane-1,7-diyl group, an octane-1,8-diyl group, a nonane-1,9-diyl group, a decane-1,10-diyl group, an undecane-1,11-diyl group, a dodecane-1,12-diyl group, a propane-1,2-diyl group, a 1-methylbutane-1,3-diyl group, a 2-methylpropane-1,3-diyl group, a pentane-1,4-diyl group, and a 2-methylbutane-1,4-diyl group.

The alicyclic hydrocarbon group may be, for example, a monocyclic or polycyclic cycloalkanediyl group, and the number of carbon atoms thereof is usually 3 to 50, preferably 3 to 20, and more preferably 3 to 10. Examples of the monocyclic or polycyclic cycloalkanediyl group include a cyclobutane-1,3-diyl group, a cyclopentane-1,3-diyl group, a cyclohexane-1,4-diyl group, a norbornane-1,4-diyl group, a norbornane-2,5-diyl group, an adamantane-1,5-diyl group, and an adamantan-2,6-diyl group.

The aromatic hydrocarbon group may be, for example, an arenediyl group, and the number of carbon atoms thereof is usually 6 to 20. Examples of the monocyclic or polycyclic arenediyl group include a benzenediyl group, a naphthalenediyl group, an anthracenediyl group, a phenanthrenidyl group, and a pyrenediyl group.

Examples of the substituent include a hydrogen atom, an alkyl group having 1 to 50 carbon atoms, a cycloalkyl group having 3 to 50 carbon atoms, an aryl group having 6 to 20 carbon atoms, a carboxy group, an amino group, and a halogen atom.

The alkyl group having 1 to 50 carbon atoms may be, for example, a saturated or unsaturated linear or branched alkyl group, and examples thereof include a methyl group, an ethyl group, a propyl group, a butyl group, a pentyl group, a hexyl group, a heptyl group, an octyl group, an isopropyl group, an isobutyl group, a sec-butyl group, a tert-butyl group, an isopentyl group, a neopentyl group, and a 2-ethylhexyl group.

Examples of the cycloalkyl group having 3 to 50 carbon atoms include a cyclopropyl group, a cyclopentyl group, a cyclohexyl group, a cycloheptyl group, and a cyclooctyl group.

Examples of the aryl group having 6 to 20 carbon atoms include a phenyl group, a biphenyl group, a tolyl group, a xylyl group, an ethylphenyl group and a naphthyl group.

Examples of the halogen atom include a fluorine atom, a chlorine atom, a bromine atom, and an iodine atom.

As the substituent, a carboxy group, an amino group and a halogen atom are preferable.

When —$CH_2$— contained in the hydrocarbon group is replaced by at least one of —O—, —CO—, and —NH—, —$CH_2$— is preferably replaced by at least one of —CO— and —NH—, and more preferably —NH—.

p is preferably 1 or 2.

Examples of the compound represented by the general formula (1) include compounds represented by the following formulas (1-1) to (1-9):

[Formula 5]

(1-1)

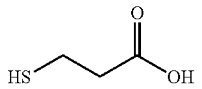

(1-2)

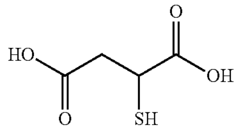

(1-3)

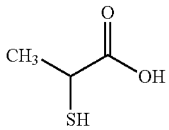

(1-4)

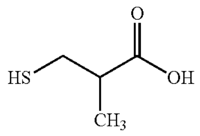

-continued (1-5)

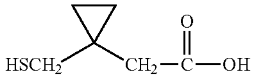

(1-6)

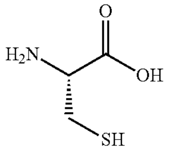

(1-7)

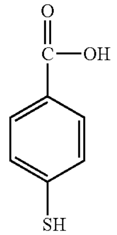

(1-8)

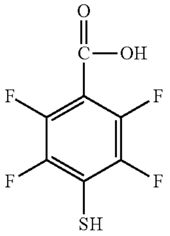

(1-9)

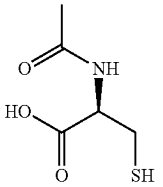

Specific examples of the carboxylic acid having a mercapto group include mercaptoacetic acid, 2-mercaptopropionic acid, 3-mercaptopropionic acid, 3-mercaptobutanoic acid, 4-mercaptobutanoic acid, mercaptosuccinic acid, mercaptostearic acid, mercaptooctanoic acid, 4-mercaptobenzoic acid, 2,3,5,6-tetrafluoro-4-mercaptobenzoic acid, L-cysteine, N-acetyl-L-cysteine, 3-methoxybutyl 3-mercaptopropionate, and 3-mercapto-2-methylpropionic acid. Of these, 3-mercaptopropionic acid and mercaptosuccinic acid are preferable.

Specific examples of (b) include unsaturated monocarboxylic acids such as (meth)acrylic acid, crotonic acid, and o-, m-, and p-vinylbenzoic acid;

unsaturated dicarboxylic acids such as maleic acid, fumaric acid, citraconic acid, mesaconic acid, itaconic acid, 3-vinylphthalic acid, 4-vinylphthalic acid, 3,4,5,6-tetrahydrophthalic acid, 1,2,3,6-tetrahydrophthalic acid, dimethyltetrahydrophthalic acid, and 1,4-cyclohexenedicarboxylic acid;

bicyclo unsaturated compounds containing a carboxy group, such as methyl-5-norbornene-2,3-dicarboxylic acid, 5-carboxybicyclo[2.2.1]hept-2-ene, 5,6-dicarboxybicyclo[2.2.1]hept-2-ene, 5-carboxy-5-methylbicyclo[2.2.1]hept-2-ene, 5-carboxy-5-ethylbicyclo[2.2.1]hept-2-ene, 5-carboxy-6-methylbicyclo[2.2.1]hept-2-ene, and 5-carboxy-6-ethylbicyclo[2.2.1]hept-2-ene;

unsaturated dicarboxylic acid anhydrides such as maleic anhydride, citraconic anhydride, itaconic anhydride, 3-vinylphthalic anhydride, 4-vinylphthalic anhydride, 3,4,5,6-tetrahydrophthalic anhydride, 1,2,3,6-tetrahydrophthalic anhydride, dimethyltetrahydrophthalic anhydride, 5,6-dicarboxybicyclo[2.2.1]hept-2-ene anhydride;

unsaturated mono[(meth)acryloyloxyalkyl]esters of di- or higher polycarboxylic acids such as mono[2-(meth)acryloyloxyethyl]succinate and mono[2-(meth)acryloyoxyethyl] phthalate; and unsaturated acrylates containing a hydroxy group and a carboxy group in the same molecule, such as α-(hydroxymethyl) acrylic acid.

Of these, (meth) acrylic acid, maleic anhydride and the like are preferable from the viewpoint of copolymerization reactivity and solubility of the obtained resin in an alkaline aqueous solution.

Here, the term (meth)acrylic acid means acrylic acid and/or methacrylic acid. Hereinafter, the same applies to "(meth)acryloyl", "(meth)acrylate" and the like.

Examples of (c) include a monomer (c1) (hereinafter also referred to as "(c1)") having a structure obtained by epoxidizing an unsaturated chain aliphatic hydrocarbon and an ethylenically unsaturated bond and a monomer (c2) (hereinafter also referred to as "(c2)") having a structure obtained by epoxidizing an unsaturated alicyclic hydrocarbon and an ethylenically unsaturated bond. In the present invention, (c) is preferably a monomer having an oxiranyl group and a (meth)acryloyloxy group. Further, (c) is preferably (c2).

Examples of (c1) include glycidyl (meth)acrylate, β-methylglycidyl (meth)acrylate, β-ethylglycidyl (meth) acrylate, glycidyl vinyl ether, o-vinylbenzyl glycidyl ether, m-vinylbenzyl glycidyl ether, p-vinylbenzyl glycidyl ether, α-methyl-o-vinylbenzyl glycidyl ether, α-methyl-m-vinylbenzyl glycidyl ether, α-methyl-p-vinylbenzyl glycidyl ether, 2,3-bis(glycidyloxymethyl)styrene, 2,4-bis(glycidyloxymethyl)styrene, 2,5-bis(glycidyloxymethyl) styrene, 2,6-bis(glycidyloxymethyl)styrene, 2,3,4-tris(glycidyloxymethyl) styrene, 2,3,5-tris(glycidyloxymethyl)styrene, 2,3,6-tris(glycidyloxymethyl) styrene, 3,4,5-tris(glycidyloxymethyl)styrene, 2,4,6-tris(glycidyloxymethyl) styrene, and compounds disclosed in Japanese Patent Laid-Open No. 7-248625.

Examples of (c2) include vinylcyclohexene monoxide, 1,2-epoxy-4-vinylcyclohexane (for example, CELLOXIDE 2000; manufactured by Daicel Corporation), 3,4-epoxycyclohexylmethylacrylate (for example, CYCLOMER A400; manufactured by Daicel Corporation), 3,4-epoxycyclohexylmethylmethacrylate (for example, CYCLOMER M100; manufactured by Daicel Corporation), a compound represented by the formula (2), and a compound represented by the formula (3):

[Formula 6]

(2)

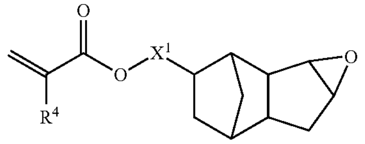

(3)

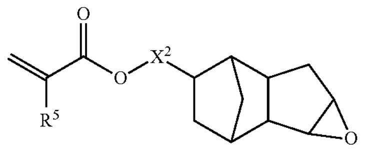

In the formulas (2) and (3), $R^4$ and $R^5$ each independently represent a hydrogen atom or an alkyl group having 1 to 4 carbon atoms, and a hydrogen atom contained in the alkyl group is optionally replaced by a hydroxy group.

$X^1$ and $X^2$ each independently represent a single bond, $—R^6—$, $*—R^6—O—$, $*—R^6—S—$, or $*—R^6—NH—$.

$R^6$ represents an alkanediyl group having 1 to 6 carbon atoms.

* represents a bond to O.

Specific examples of the alkyl group having 1 to 4 carbon atoms include a methyl group, an ethyl group, an n-propyl group, an isopropyl group, an n-butyl group, a sec-butyl group, and a tert-butyl group.

Examples of the hydroxyalkyl group include a hydroxymethyl group, a 1-hydroxyethyl group, a 2-hydroxyethyl group, a 1-hydroxypropyl group, a 2-hydroxypropyl group, a 3-hydroxypropyl group, a 1-hydroxy-1-methylethyl group, a 2-hydroxy-1-methylethyl group, a 1-hydroxybutyl group, a 2-hydroxybutyl group, a 3-hydroxybutyl group, and a 4-hydroxybutyl group.

Preferred examples of $R^4$ and $R^5$ include a hydrogen atom, a methyl group, a hydroxymethyl group, a 1-hydroxyethyl group and a 2-hydroxyethyl group, and more preferred examples thereof include a hydrogen atom and a methyl group.

Examples of the alkanediyl group include a methylene group, an ethylene group, a propane-1,2-diyl group, a propane-1,3-diyl group, a butane-1,4-diyl group, a pentane-1,5-diyl group, and a hexane-1,6-diyl group.

Preferred examples of $X^1$ and $X^2$ include a single bond, a methylene group, an ethylene group, $*—CH_2—O—$, and $*—CH_2CH_2—O—$, and more preferred examples thereof include a single bond and $*—CH_2CH_2—O—$. * represents a bond to O.

Examples of the compound represented by the formula (2) include compounds represented by the formula (2-1) to the formula (2-15). Preferred are compounds represented by the formula (2-1), the formula (2-3), the formula (2-5), the formula (2-7), the formula (2-9), and the formula (2-11) to the formula (2-15), and more preferred are compounds represented by the formula (2-1), the formula (2-7), the formula (2-9), and the formula (2-15):

[Formula 7]

(2-1)

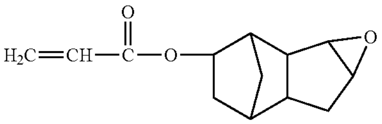

(2-2)

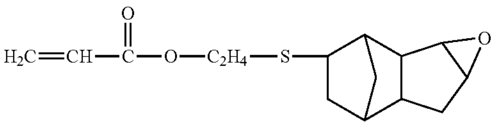

(2-3)

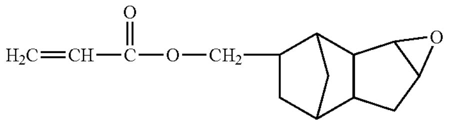

(2-4)

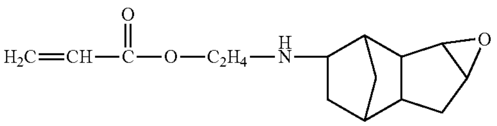

-continued (2-5)

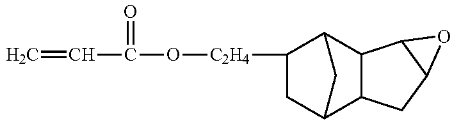

(2-6)

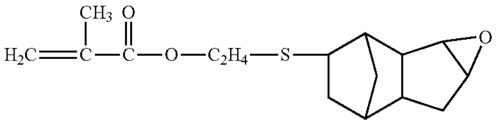

(2-7)

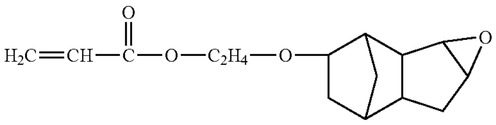

(2-8)

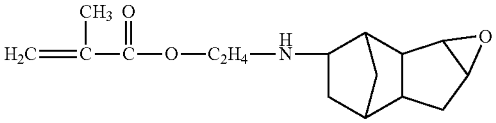

[Formula 8]

(2-9)

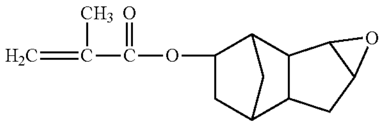

(2-10)

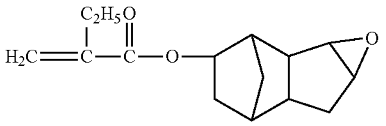

(2-11)

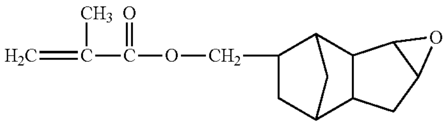

(2-12)

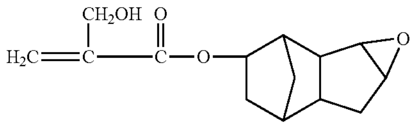

(2-13)

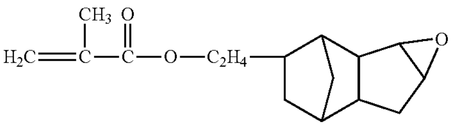

(2-14)

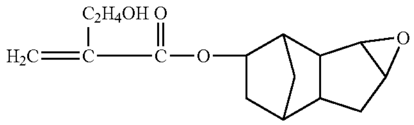

(2-15

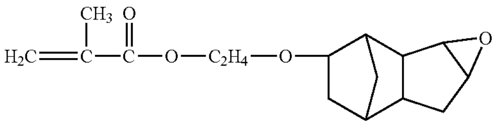

Examples of the compound represented by the formula (3) include compounds represented by the formula (3-1) to the formula (3-15). Preferred are compounds represented by the formula (3-1), the formula (3-3), the formula (3-5), the formula (3-7), the formula (3-9), and the formula (3-11) to the formula (3-15), and more preferred are compounds represented by the formula (3-1), the formula (3-7), the formula (3-9), and the formula (3-15):

[Formula 9]

(3-1)

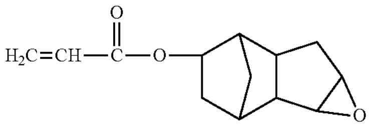

(3-2)

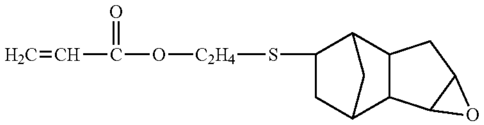

(3-3)

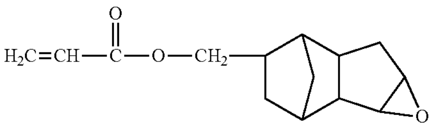

(3-4)

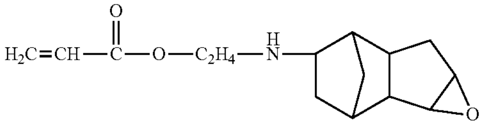

(3-5)

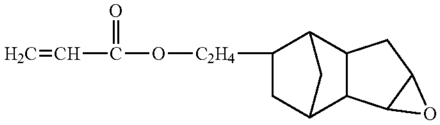

(3-6)

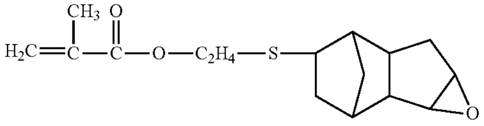

(3-7)

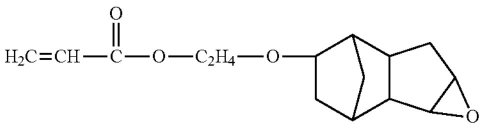

(3-8)

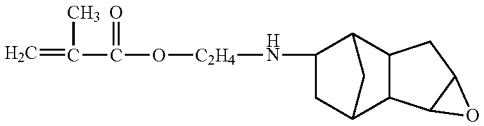

[Formula 10]

(3-9)

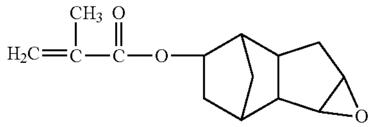

(3-10)

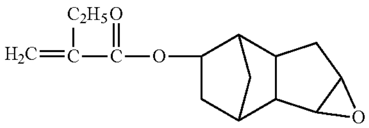

-continued (3-11)

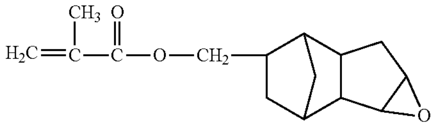

(3-12)

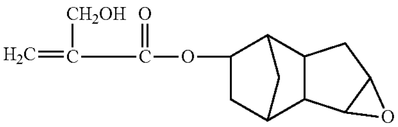

(3-13)

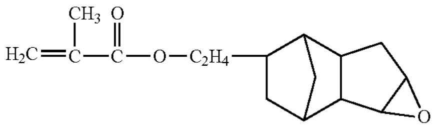

(3-14)

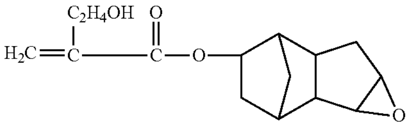

(3-15)

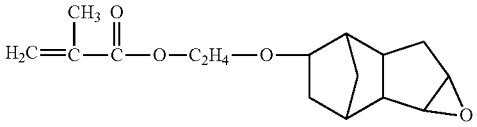

Each of the compound represented by the formula (2) and the compound represented by the formula (3) can be used independently. Also, they can be mixed in any ratio. In the case of mixing, the mixing ratio is preferably in molar ratio of 5:95 to 95:5, more preferably 10:90 to 90:10, and still more preferably 20:80 to 80:20, in the compound represented by the formula (2): the compound represented by the formula (3).

The polymer (B1) may further have a structural unit derived from (b) and (c) and a structural unit derived from (b) in addition to the structural unit derived from (a), (b), and (c).

The polymer (B1) may also have a structural unit derived from a monomer (d) copolymerizable with (b) (provided that the monomer is different from (a), (b), and (c)) (hereinafter sometimes referred to as "(d)"). The polymer (B1) may have, for example, a structural unit derived from (d), a structural unit derived from (b) and (d), a structural unit derived from (b), (c), and (d), a structural unit derived from (a), (b), (c), and (d), and the like.

Examples of (d) include (meth)acrylic alkyl esters, such as methyl (meth)acrylate, ethyl (meth)acrylate, n-butyl (meth)acrylate, sec-butyl (meth)acrylate, and tert-butyl (meth)acrylate;

(meth)acrylic cycloalkyl esters such as cyclohexyl (meth) acrylate, 2-methylcyclohexyl (meth)acrylate, tricyclo $[5.2.1.0^{2,6}]$decan-8-yl (meth)acrylate (referred to as dicyclopentanyl (meth)acrylate (common name) in the art), tricyclo$[5.2.1.0^{2,6}]$decen-8-yl (meth)acrylate (referred to as dicyclopentenyl (meth)acrylate (common name) in the art), dicyclopentanyloxyethyl (meth)acrylate, and isobornyl (meth)acrylate;

(meth)acrylic aryl or aralkyl esters such as phenyl (meth) acrylates and benzyl (meth)acrylates;

dicarboxylic diesters such as diethyl maleate, diethyl fumarate, and diethyl itaconate;

(meth)acrylic hydroxy alkyl esters such as 2-hydroxyethyl (meth)acrylate and 2-hydroxypropyl (meth)acrylate;

bicyclo unsaturated compounds such as bicyclo[2.2.1]hept-2-ene, 5-methylbicyclo[2.2.1]hept-2-ene, 5-ethylbicyclo[2.2.1]hept-2-ene, 5-hydroxybicyclo[2.2.1]hept-2-ene, 5-hydroxymethylbicyclo[2.2.1]hept-2-ene, 5-(2'-hydroxyethyl)bicyclo[2.2.1]hept-2-ene, 5-methoxybicyclo[2.2.1]hept-2-ene, 5-ethoxybicyclo[2.2.1]hept-2-ene, 5,6-dihydroxybicyclo[2.2.1]hept-2-ene, 5,6-di(hydroxymethyl)bicyclo[2.2.1]hept-2-ene, 5,6-di(2'-hydroxyethyl)bicyclo[2.2.1]hept-2-ene, 5,6-dimethoxybicyclo[2.2.1]hept-2-ene, 5,6-diethoxybicyclo[2.2.1]hept-2-ene, 5-hydroxy-5-methylbicyclo[2.2.1]hept-2-ene, 5-hydroxy-5-ethylbicyclo[2.2.1]hept-2-ene, 5-hydroxymethyl-5-methylbicyclo[2.2.1]hept-2-ene, 5-tert-butoxycarbonylbicyclo[2.2.1]hept-2-ene, 5-cyclohexyloxycarbonylbicyclo[2.2.1]hept-2-ene, 5-phenoxycarbonylbicyclo[2.2.1]hept-2-ene, 5,6-bis(tert-butoxycarbonyl)bicyclo[2.2.1]hept-2-ene, and 5,6-bis(cyclohexyloxycarbonyl)bicyclo[2.2.1]hept-2-ene;

dicarbonylimide derivatives such as N-phenylmaleimide, N-cyclohexylmaleimide, N-benzylmaleimide, N-succinimidyl-3-maleimidobenzoate, N-succinimidyl-4-maleimidobutyrate, N-succinimidyl-6-maleimide caproate, N-succinimidyl-3-maleimide propionate, and N-(9-acridinyl)maleimide;

styrenes such as styrene, α-methylstyrene, m-methylstyrene, p-methylstyrene, vinyltoluene, and p-methoxystyrene;

acrylonitriles such as acrylonitrile and methacrylonitrile; vinyl compounds such as vinyl chloride, vinylidene chloride, and vinyl acetate; acrylamides such as acrylamide and methacrylamide; diene compounds such as 1,3-butadiene, isoprene, and 2,3-dimethyl-1,3-butadiene;

oxetanyl group-containing (meth)acrylic esters such as 3-methyl-3-methacryloyloxymethyloxetane, 3-methyl-3-acryloyloxymethyloxetane, 3-ethyl-3-methacryloyloxymethyloxetane, 3-ethyl-3-acryloyloxymethyloxetane, 3-methyl-3-methacryloyloxyethyloxetane, 3-methyl-3-acryloyloxyethyloxetane, 3-ethyl-3-methacryloyloxyethyloxetane, and 3-ethyl-3-acryloyloxyethyloxetane; and tetrahydrofuryl group-containing (meth)acrylic esters such as tetrahydrofurfuryl acrylate (for example, Viscoat V #150, manufactured by OSAKA ORGANIC CHEMICAL INDUSTRY LTD.) and tetrahydrofurfuryl methacrylate.

Among these, styrene, dicyclopentenyl (meth)acrylate, N-phenylmaleimide, N-cyclohexylmaleimide, N-benzylmaleimide, and bicyclo[2.2.1]hept-2-ene are preferable from the viewpoint of copolymerization reactivity and alkaline solubility.

When the polymer (B1) is composed of the monomers (a), (b), and (c), the proportion of each monomer to the total number of moles of the monomers constituting the polymer (B1) (hereinafter, also referred to as molar ratio) is preferably in the following range from the viewpoint of emission intensity, solvent resistance, and developability.

Monomer (a): 0.01% or more and 10 mol % or less (more preferably 0.1 mol % or more and 5 mol % or less)

Monomer (b): 30 mol % or more and 98.99 mol % or less (more preferably 65 mol % or more and 94.9 mol % or less)

Monomer (c): 1 mol % or more and 60 mol % or less (more preferably 15 mol % or more and 50 mol % or less)

When the polymer (B1) is composed of the monomers (a), (b), (c), and (d), the molar ratio of each monomer is preferably in the following range from the viewpoint of emission intensity, solvent resistance, and developability.

Monomer (a): 0.01% or more and 10 mol % or less (more preferably 0.1 mol % or more and 5 mol % or less)

Monomer (b): 30 mol % or more and 98.99 mol % or less (more preferably 30 mol % or more and 94.9 mol % or less)

Monomer (c): 1 mol % or more and 60 mol % or less (more preferably 15 mol % or more and 50 mol % or less)

Monomer (d): 1 mol % or more and 60 mol % or less (more preferably 15 mol % or more and 50 mol % or less)

The total number of moles of (b) and (c) is preferably 70 mol % or more and 99 mol % or less based on the total number of moles of all structural units constituting the polymer (B1).

The molar ratio is a molar ratio calculated from the amount of the monomer charged.

The polymer [B1] can be produced with reference to the method disclosed in for example, a document "Experimental Method for Polymer Synthesis" (edited by Takayuki Otsu, published by Kagaku-Dojin Publishing Company, INC, First Edition, First Printed on Mar. 1, 1972) and cited documents described in the above-mentioned document.

Specific examples thereof include the following method: predetermined amounts of monomers, a polymerization initiator, a solvent, and the like are placed in a reaction vessel; a deoxidization atmosphere is formed by substituting oxygen with nitrogen; and these are heated or kept warm during stirring. The polymerization initiator, the solvent and the like used here are not particularly limited, and any of those commonly used in the art can be used. Examples of the polymerization initiator include azo compounds (2,2'-azobisisobutyronitrile, 2,2'-azobis(2,4-dimethylvaleronitrile), and the like) and organic peroxides (benzoyl peroxide and the like), and the solvent may be any solvent capable of dissolving each monomer, and solvents described below as the solvent (G) of the composition of the present invention or the like can be used.

Examples thereof include a method in which a monomer (b) is first polymerized, a monomer (c) is then added and reacted, a monomer (a) is then added and reacted. Examples thereof further include a method in which monomers (b) and (d) are first polymerized, monomer (c) is then added and reacted, and monomer (a) is then added and reacted.

A solution after a reaction, of the resultant polymer (B1) may be used as it is; a concentrated or diluted solution of the copolymer (B1) may be used; or a solid (powder) taken out from the polymer (B1) by a method such as reprecipitation may be used. In particular, by using the same solvent as the solvent (G) described later as the solvent in this polymerization, the solution after the reaction can be used as it is for the preparation of the curable resin composition, whereby the producing process of the curable resin composition can be simplified.

The polymer (B1) may be a polymer having a structural unit represented by the following general formulas (ba), (bb), and (bc) (structures containing a side chain in brackets in the formulas):

[Formula 11]

(ba)

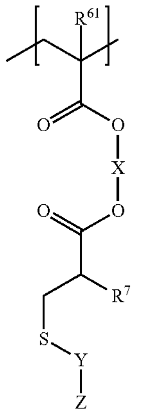

(bb)

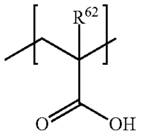

(bc)

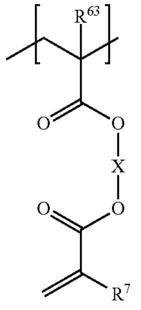

[In the formula, $R^{61}$, $R^{62}$, and $R^{63}$ each independently represent a hydrogen atom or a methyl group;

$R^7$ represents a hydrogen atom or an alkyl group having 1 to 4 carbon atoms, and a hydrogen atom contained in the alkyl group is optionally replaced by a hydroxy group;

X represents *—$R^8$—$X^3$—, *—$R^8$—O—$X^3$—, *—$R^8$—S—$X^3$—, or *—$R^8$—NH—$X^3$—; * represents a bond to an oxygen atom on a $R^7$ side; $R^8$ represents an alkanediyl group having 1 to 6 carbon atoms; $X^3$ represents an ethylene group or a divalent alicyclic hydrocarbon group, which has a hydroxy group;

Y represents —(R)p- and R and p are the same as defined above;  represents a bond to S; and Z represents a carboxy group.]

The structural unit represented by the general formula (ba) may be a structural unit derived from (a), (b), and (c). The structural unit represented by the general formula (bb) may be a structural unit derived from (b). The structural unit represented by the general formula (bc) may be a structural unit derived from (b) and (c).

Specific examples of the alkyl group having 1 to 4 carbon atoms in $R^7$ include a methyl group, an ethyl group, an n-propyl group, an isopropyl group, an n-butyl group, a sec-butyl group, and a tert-butyl group.

Examples of the hydroxyalkyl group in $R^7$ include a hydroxymethyl group, a 1-hydroxyethyl group, a 2-hydroxyethyl group, a 1-hydroxypropyl group, a 2-hydroxypropyl group, a 3-hydroxypropyl group, a 1-hydroxy-1-methylethyl group, a 2-hydroxy-1-methylethyl group, a 1-hydroxybutyl group, a 2-hydroxybutyl group, a 3-hydroxybutyl group, and a 4-hydroxybutyl group.

$R^7$ is preferably a hydrogen atom, a methyl group, a hydroxymethyl group, a 1-hydroxyethyl group, or a 2-hydroxyethyl group, and more preferably a hydrogen atom or a methyl group.

Examples of the alkanediyl group having 1 to 6 carbon atoms in $R^8$ include a methylene group, an ethylene group, a propane-1,2-diyl group, a propane-1,3-diyl group, a butane-1,4-diyl group, a pentane-1,5-diyl group, and a hexane-1,6-diyl group.

X is preferably *—C—$X^3$—, *—$CH_2CH_2$—$X^3$—, *—$CH_2$—O—$X^3$—, or *—$CH_2CH_2$—O—$X^3$—.

Examples of the divalent alicyclic hydrocarbon group having a hydroxy group in $X^3$ include groups represented by the following formulas:

[Formula 12]

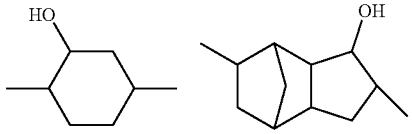

Examples of X include groups represented by the following formulas (X-1) to (X-14):

[Formula 13]

(X-1)

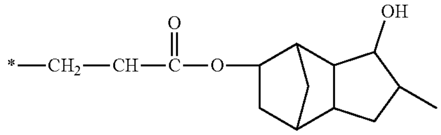

(X-2)

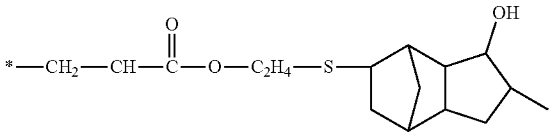

(X-3)

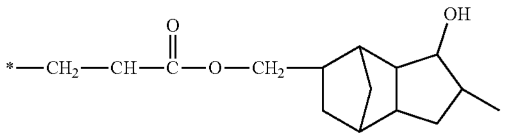

(X-4)

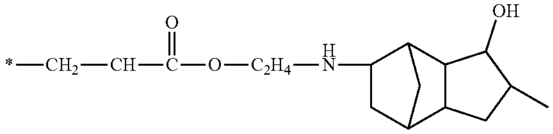

-continued (X-5)

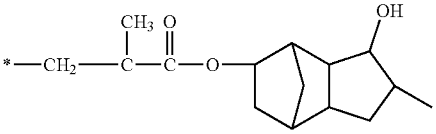

(X-6)

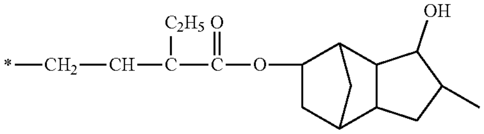

(X-7)

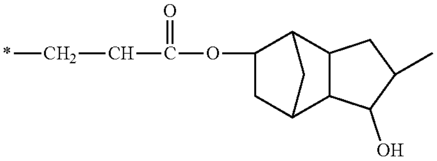

(X-8)

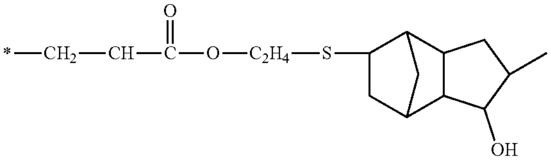

(X-9)

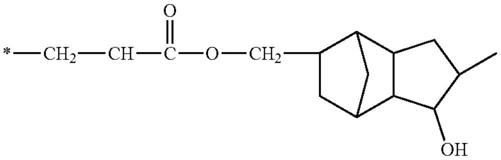

(X-10)

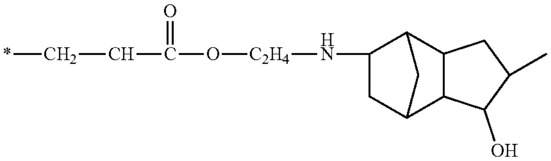

(X-11)

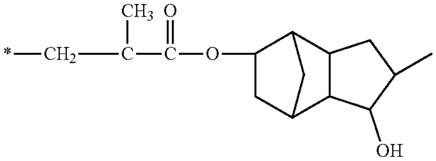

(X-12)

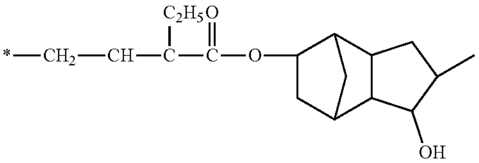

(X-13)

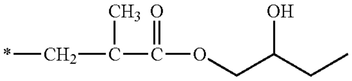

(X-14)

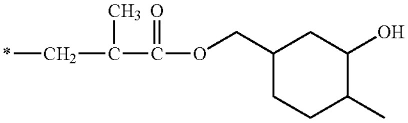

Examples of Y include groups represented by the following formulas (Y-1) to (Y-8):

[Formula 14]

(Y-1)

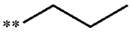

(Y-2)

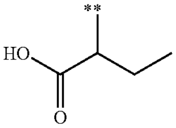

(Y-3)

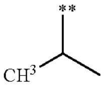

(Y-4)

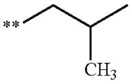

(Y-5)

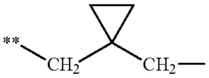

(Y-6)

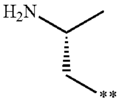

(Y-7)

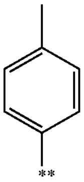

(Y-8)

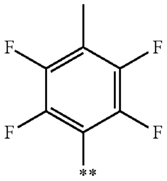

Examples of combinations of $R^{61}$, $R^{62}$, $R^{63}$, $R^7$, X, and Y include combinations (b-1) to (b-48) shown in Table 1 below.

TABLE 1

| | $R^{61}$ | $R^{62}$ | $R^{63}$ | $R^7$ | X | Y |
|---|---|---|---|---|---|---|
| (b-1) | $CH_3$ | $CH_3$ | $CH_3$ | $CH_3$ | (X-13) | (Y-1) |
| (b-2) | $CH_3$ | $CH_3$ | $CH_3$ | $CH_3$ | (X-13) | (Y-2) |
| (b-3) | $CH_3$ | $CH_3$ | $CH_3$ | $CH_3$ | (X-13) | (Y 3) |
| (b-4) | $CH_3$ | $CH_3$ | $CH_3$ | $CH_3$ | (X-13) | (Y-4) |
| (b-5) | $CH_3$ | $CH_3$ | $CH_3$ | $CH_3$ | (X-13) | (Y-5) |
| (b-6) | $CH_3$ | $CH_3$ | $CH_3$ | $CH_3$ | (X-13) | (Y-6) |
| (b-7) | $CH_3$ | $CH_3$ | $CH_3$ | $CH_3$ | (X-13) | (Y-7) |
| (b-8) | $CH_3$ | $CH_3$ | $CH_3$ | $CH_3$ | (X-13) | (Y-8) |
| (b-9) | H | H | H | H | (X-13) | (Y-1) |
| (b-10) | H | H | H | H | (X-13) | (Y-2) |
| (b-11) | H | H | H | H | (X-13) | (Y-3) |
| (b-12) | H | H | H | H | (X-13) | (Y-4) |
| (b-13) | H | H | H | H | (X-13) | (Y-5) |
| (b-14) | H | H | H | H | (X-13) | (Y-6) |
| (b-15) | H | H | H | H | (X-13) | (Y-7) |
| (b-16) | H | H | H | H | (X-13) | (Y-8) |

TABLE 1-continued

| | $R^{61}$ | $R^{62}$ | $R^{63}$ | $R^7$ | X | Y |
|---|---|---|---|---|---|---|
| (b-17) | $CH_3$ | $CH_3$ | $CH_3$ | $CH_3$ | (X-14) | (Y-1) |
| (b-18) | $CH_3$ | $CH_3$ | $CH_3$ | $CH_3$ | (X-14) | (Y-2) |
| (b-19) | $CH_3$ | $CH_3$ | $CH_3$ | $CH_3$ | (X-14) | (Y-3) |
| (b-20) | $CH_3$ | $CH_3$ | $CH_3$ | $CH_3$ | (X-14) | (Y-4) |
| (b-21) | $CH_3$ | $CH_3$ | $CH_3$ | $CH_3$ | (X-14) | (Y-5) |
| (b 22) | $CH_3$ | $CH_3$ | $CH_3$ | $CH_3$ | (X-14) | (Y-6) |
| (b-23) | $CH_3$ | $CH_3$ | $CH_3$ | $CH_3$ | (X-14) | (Y-7) |
| (b-24) | $CH_3$ | $CH_3$ | $CH_3$ | $CH_3$ | (X-14) | (Y-8) |

TABLE 2

| | $R^{61}$ | $R^{62}$ | $R^{63}$ | $R^7$ | X | Y |
|---|---|---|---|---|---|---|
| (b-25) | H | H | H | H | (X-14) | (Y-1) |
| (b-26) | H | H | H | H | (X-14) | (Y-2) |
| (b-27) | H | H | H | H | (X-14) | (Y-3) |
| (b-28) | H | H | H | H | (X-14) | (Y-4) |
| (b-29) | H | H | H | H | (X-14) | (Y-5) |
| (b-30) | H | H | H | H | (X-14) | (Y-6) |
| (b-31) | H | H | H | H | (X-14) | (Y-7) |
| (b-32) | H | H | H | H | (X-14) | (Y-8) |
| (b-33) | $CH_3$ | $CH_3$ | $CH_3$ | $CH_3$ | (X-1) | (Y-1) |
| (b-34) | $CH_3$ | $CH_3$ | $CH_3$ | $CH_3$ | (X-1) | (Y-2) |
| (b-35) | $CH_3$ | $CH_3$ | $CH_3$ | $CH_3$ | (X-1) | (Y-3) |
| (b-36) | $CH_3$ | $CH_3$ | $CH_3$ | $CH_3$ | (X-1) | (Y-4) |
| (b-37) | $CH_3$ | $CH_3$ | $CH_3$ | $CH_3$ | (X-1) | (Y-5) |
| (b-38) | $CH_3$ | $CH_3$ | $CH_3$ | $CH_3$ | (X-1) | (Y-6) |
| (b-39) | $CH_3$ | $CH_3$ | $CH_3$ | $CH_3$ | (X-1) | (Y-7) |
| (b-40) | $CH_3$ | $CH_3$ | $CH_3$ | $CH_3$ | (X-1) | (Y-8) |
| (b-41) | H | H | H | H | (X-1) | (Y-1) |
| (b-42) | H | H | H | H | (X-1) | (Y-2) |
| (b-43) | H | H | H | H | (X-1) | (Y-3) |
| (b-44) | H | H | H | H | (X-1) | (Y-4) |
| (b-45) | H | H | H | H | (X-1) | (Y-5) |
| (b-46) | H | H | H | H | (X-1) | (Y-6) |
| (b-47) | H | H | H | H | (X-1) | (Y-7) |
| (b-48) | H | H | H | H | (X-1) | (Y-8) |

When the polymer (B1) contains the structural units represented by the general formulas (ba), (bb), and (bc), the content of the structural unit represented by the general formula (ba) may be, for example, based on the total amount of the polymer (B1), 0.01% by mass or more and 10% by mass or less, and is preferably 0.05% by mass or more and 5% by mass or less, and more preferably 0.1% by mass or more and 3% by mass or less, from the viewpoint of emission intensity, developability, and solvent resistance.

When the polymer (B1) contains the structural units represented by the general formulas (ba), (bb), and (bc), the content of the structural unit represented by the general formula (bb) may be, for example, based on the total amount of the polymer (B1), 10% by mass or more and 80% by mass or less, and is preferably 20% by mass or more and 70% by mass or less, and more preferably 30% by mass or more and 60% by mass or less, from the viewpoint of emission intensity, developability, and solvent resistance.

When the polymer (B1) contains the structural units represented by the general formulas (ba), (bb), and (bc), the content of the structural unit represented by the general formula (bc) may be, for example, based on the total amount of the polymer (B1), 10% by mass or more and 70% by mass or less, and is preferably 20% by mass or more and 60% by mass or less, and more preferably 30% by mass or more and 50% by mass or less, from the viewpoint of emission intensity, developability, and solvent resistance.

The polymer (B1) is preferably a polymer containing the structural units represented by the general formulas (ba), (bb), and (bc) in the main chain, and more preferably, the main chain is a polymer composed of the structural units represented by the general formulas (ba), (bb), and (bc).

In the polymer (B1), the number of sulfide groups per one molecule calculated from the charging ratio (hereinafter, also referred to as modification amount calculated from the charging ratio) may be, for example, 0.5 or more and 3 or less, and preferably 0.75 or more and 2 or less.

The weight-average molecular weight of the polymer (B1) may be, for example, 1000 or more and 200000 or less. The weight-average molecular weight of the polymer (B1) is preferably 3000 or more, more preferably 4000 or more, still more preferably 5000 or more, and further preferably 6000 or more, from the viewpoint of emission amount, developability, and heat resistance. The weight-average molecular weight of the polymer (B1) is preferably 30000 or less, more preferably 20000 or less, still more preferably 15000 or less, and further preferably 10000 or less, from the viewpoint of emission amount, developability, and heat resistance. The weight-average molecular weight is determined by the method described in Examples described later.

The acid value of the polymer (B1) is in the range of 90 mg KOH/g or more and 150 mg KOH/g or less based on the solid content. When the acid value is less than 90 mg KOH/g, the solubility in an alkali developer may be lowered and residue may be left on the substrate, and when the acid value is more than 150 mg KOH/g, peeling of the cured pattern is more likely to occur. The acid value of the polymer (B1) is in the range of 95 mg KOH/g or more and 140 mg KOH/g or less, more preferably in the range of 100 mg KOH/g or more and 130 mg KOH/g or less, from the viewpoint of the developability. Here, the acid value is a value measured as the amount (mg) of potassium hydroxide necessary for neutralizing 1 g of the polymer (B1), and can be determined by titrating with, for example, an aqueous potassium hydroxide solution. The acid value of the polymer (B1) is measured according to the measurement method described in the section of Examples below.

The polymer (B1) may contain a resin having an acrylic equivalent of, for example, 300 g/eq or more and 2000 g/eq or less (hereinafter, also referred to as an acrylic resin). The acrylic resin preferably has an acrylic equivalent of 500 g/eq or more and 1500 g/eq or less. When the polymer (B1) contains an acrylic resin, development which is quenched during the color filter process tends to be easily prevented. On the other hand, when the polymer (B1) contains a resin having an acrylic equivalent of more than 2000 g/eq, the ability to effectively protect the quantum dots tends to be difficult to obtain, and when the resin contains a resin having an acrylic equivalent of less than the above range, the resin tends to be easily peeled off without being dissolved during development. Preferably, the polymer (B1) is an acrylic resin.

Example of the resin (B) in the alkali-soluble resin disclosed in Japanese Patent Laid-Open No. 2018-123274. Specific examples thereof include a polymer (B2) which has a double bond in a side chain, includes a structural unit (α) represented by the following general formula (4) and a structural unit (β) represented by the following general formula (5) in a main chain, and further includes an acid group. The acid group may be introduced into the resin when, for example, the resin (B2) contains a structural unit (γ) derived from an acid group-containing monomer (for example, (meth)acrylic acid). The resin (B2) preferably contains the structural units (α), (β), and (γ) in the main chain skeleton.

[Formula 15]

(4)

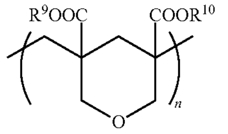

[In the formula, $R^9$ and $R^{10}$ are the same or different and each represent a hydrogen atom or a hydrocarbon group having 1 to 25 carbon atoms. n represents the average number of repeating units of the structural units represented by the general formula (4), and is a number of 1 or more.]

[Formula 16]

(5)

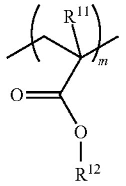

[In the formula, each $R^{11}$ is the same or different and represents a hydrogen atom or a methyl group. Each $R^{12}$ is the same or different and represents a linear or branched chain hydrocarbon group having 4 to 20 carbon atoms. m represents the average number of repeating units of the structural units represented by the general formula (5), and is a number of 1 or more.]

The content proportion of the structural unit (α) in the polymer (B2) may be, for example, from the viewpoint of heat resistance and storage stability, 0.5% by mass or more and 50% by mass or less, preferably 1% by mass or more and 40% by mass or less, and more preferably 5% by mass or more and 30% by mass or less based on 100% by mass of the total amount of all monomer units that give the main chain skeleton of the polymer (B2). In the general formula (4), n represents the average number of repeating units of the structural units (α) in the polymer (B2), and n can be set so that the content proportion of the structural units (α) falls within the above range.

The content proportion of the structural unit (β) may be, for example, from the viewpoint of the solvent resistance, 10% by mass or more and 90% by mass or less, preferably 20% by mass or more and 80% by mass or less, and more preferably 30% by mass or more and 75% by mass or less based on 100% by mass of the total amount of all monomer units that give the main chain skeleton of the polymer (B2). In the general formula (5), m represents the average number of repeating units of the structural units (β) in the polymer (B2), and m can be set so that the content proportion of the structural units (β) falls within the above range.

The content proportion of the structural unit (γ) may be, for example, from the viewpoint of the solubility in the alkaline substance and the solubility in the solvent, 0.5% by mass or more and 50% by mass or less, preferably 2% by mass or more and 50% by mass or less, and more preferably 5% by mass or more and 45% by mass or less based on 100% by mass of the total amount of all monomer units that give the main chain skeleton of the polymer (B2).

The content ratio of the resin (B) in the composition may be, for example, from the viewpoint of emission intensity, developability, and solvent resistance, 5% by mass or more and 80% by mass or less, preferably 10% by mass or more and 70% by mass or less, more preferably 13% by mass or more and 60% by mass or less, and still more preferably 17% by mass or more and 55% by mass or less based on the total amount of the solid content of the composition.

[3] Photopolymerizable Compound (C)

The photopolymerizable compound (C) is a compound that can be polymerized by an active radical, an acid, or the like generated from the photopolymerization initiator (D) described later, and examples thereof include a compound having an ethylenically unsaturated bond, and a (meth) acrylic ester compound is preferable.

As used herein, the term "(meth)acrylic acid" represents at least one selected from the group consisting of acrylic acid and methacrylic acid. Notations such as "(meth)acryloyl" and "(meth)acrylate" have the same meaning.

In particular, the photopolymerizable compound (C) is preferably a polymerizable compound having three or more ethylenically unsaturated bonds. Examples of such a polymerizable compound include trimethylolpropane tri(meth) acrylate, pentaerythritol tri(meth)acrylate, pentaerythritol tetra(meth)acrylate, dipentaerythritol penta(meth)acrylate, dipentaerythritol hexa(meth)acrylate, tripentaerythritol octa (meth)acrylate, tripentaerythritol hepta(meth)acrylate, tetrapentaerythritol deca(meth)acrylate, tetrapentaerythritol nona (meth)acrylate, tris(2-(meth)acryloyloxyethyl)isocyanurate, ethylene glycol-modified pentaerythritol tetra(meth)acrylate, ethylene glycol-modified dipentaerythritol hexa(meth) acrylate, propylene glycol-modified pentaerythritol tetra(meth)acrylate, propylene glycol-modified dipentaerythritol hexa(meth)acrylate, caprolactone-modified pentaerythritol tetra(meth)acrylate, and caprolactone-modified dipentaerythritol hexa(meth)acrylate.

The weight-average molecular weight of the photopolymerizable compound (C) is preferably 150 or more and 2900 or less, and more preferably 250 or more and 1500 or less.

The content ratio of the photopolymerizable compound (C) in the composition is preferably, for example, based on the total amount of the solid content of the composition, 7% by mass or more and 60% by mass or less, more preferably 10% by mass or more and 45% by mass or less, and still more preferably 13% by mass or more and 30% by mass or less. When the content ratio of the photopolymerizable compound (C) is within the above range, the residual film ratio of the cured pattern and the chemical resistance of the cured pattern tend to be further improved.

[4] Photopolymerization Initiator (D)

The photopolymerization initiator (D) is a compound capable of initiating a polymerization by generating an active radical, an acid, or the like by the action of light or heat, and can contain at least one selected from the group consisting of an oxime compound, a biimidazole compound, a triazine compound, and an acylphosphine compound. Above all, it is preferable to contain an oxime compound. When these polymerization initiators are used, the residual film ratio of the cured pattern is increased.

The oxime compound, the biimidazole compound, the triazine compound, and the acylphosphine compound tend to have higher polymerization sensitivity during the production of the cured film, and thus are preferably compounds having at least two aromatic rings in the molecule.

Examples of the aromatic ring include 5-membered rings such as a furan ring, a pyrrole ring, an imidazole ring, a thiophene ring, and a thiazole ring; 6-membered rings such as a benzene ring, a pyridine ring, a pyrimidine ring, and a triazine ring; and condensed rings thereof.

The oxime compound is preferably an O-acyloxime compound, and is a compound having a partial structure represented by the formula (d1). Hereinafter, * represents a bond.

[Formula 17]

(d1)

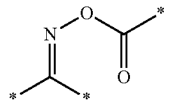

Examples of the oxime compound include N-benzoyloxy-1-(4-phenylsulfanylphenyl)butan-1-one-2-imine, N-benzoyloxy-1-(4-phenylsulfanylphenyl)octan-1-one-2-imine, N-benzoyloxy-1-(4-phenylsulfanylphenyl)-3-cyclopentyl-propan-1-one-2-imine, N-acetoxy-1-[9-ethyl-6-(2-methylbenzoyl)-9H-carbazole-3-yl]ethane-1-imine, N-acetoxy-1-[9-ethyl-6-{2-methyl-4-(3,3-dimethyl-2,4-dioxacyclopentanylmethyloxy)benzoyl}-9H-carbazole-3-yl]ethane-1-imine, N-acetoxy-1-[9-ethyl-6-(2-methylbenzoyl)-9H-carbazole-3-yl]-3-cyclopentylpropane-1-imine, and N-benzoyloxy-1-[9-ethyl-6-(2-methylbenzoyl)-9H-carbazole-3-yl]-3-cyclopentylpropan-1-one-2-imine, and compounds disclosed in Japanese Patent Laid-Open No. 2011-132215, International Publication No. 2008/78678, International Publication No. 2008/78686, and International Publication No. 2012/132558. Commercially available products such as Irgacure OXE01 and Irgacure OXE02 (all manufactured by BASF Japan Ltd.), and N-1919 (manufactured by ADEKA Corporation) may also be used.

Of these, the oxime compound is preferably at least one selected from the group consisting of N-benzoyloxy-1-(4-phenylsulfanylphenyl)butan-1-one-2-imine, N-benzoyloxy-1-(4-phenylsulfanylphenyl)octan-1-one-2-imine, and N-benzoyloxy-1-(4-phenylsulfanylphenyl)-3-cyclopentyl-propan-1-one-2-imine, and more preferably N-benzoyloxy-1-(4-phenylsulfanylphenyl)octan-1-one-2-imine.

An example of the biimidazole compound is a compound represented by the formula (d5):

[Formula 18]

(d5)

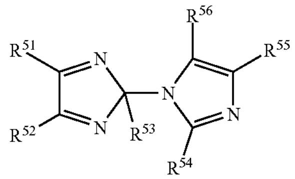

[In the formula (d5), $R^{51}$ to $R^{56}$ represent an aryl group having 6 to 10 carbon atoms which may have a substituent.]

Examples of the aryl group having 6 to 10 carbon atoms include a phenyl group, a toluyl group, a xylyl group, an ethylphenyl group, and a naphthyl group, and preferable is a phenyl group.

Examples of the substituent include a halogen atom and an alkoxy group having 1 to 4 carbon atoms. Examples of the halogen atom include a fluorine atom, a chlorine atom, a bromine atom and an iodine atom, and preferable is a chlorine atom. Examples of the alkoxy group having 1 to 4 carbon atoms include a methoxy group, an ethoxy group, a propoxy group, and a butoxy group, and preferable is a methoxy group.

Examples of the biimidazole compound include 2,2'-bis(2-chlorophenyl)-4,4',5,5'-tetraphenylbiimidazole, 2,2'-bis(2,3-dichlorophenyl)-4,4',5,5'-tetraphenylbiimidazole (for example, see Japanese Patent Laid-Open No. 06-75372 and Japanese Patent Laid-Open No. 06-75373), 2,2'-bis(2-chlorophenyl)-4,4',5,5'-tetraphenyl biimidazole, 2,2'-bis(2-chlorophenyl)-4,4',5,5'-tetra(alkoxyphenyl)biimidazole, 2,2'-bis(2-chlorophenyl)-4,4',5,5'-tetra(dialkoxyphenyl) biimidazole, 2,2'-bis(2-chlorophenyl)-4,4',5,5'-tetra(trialkoxyphenyl)biimidazole (for example, see Japanese Patent No. 48-38403 and Japanese Patent Laid-Open No. 62-174204), and an imidazole compound in which phenyl groups at the 4,4',5,5' positions are each substituted with a carboalkoxy group (for example, see Japanese Patent Laid-Open No. 7-10913). Of these, a compound represented by the following formula or a mixture thereof is preferable.

[Formula 19]

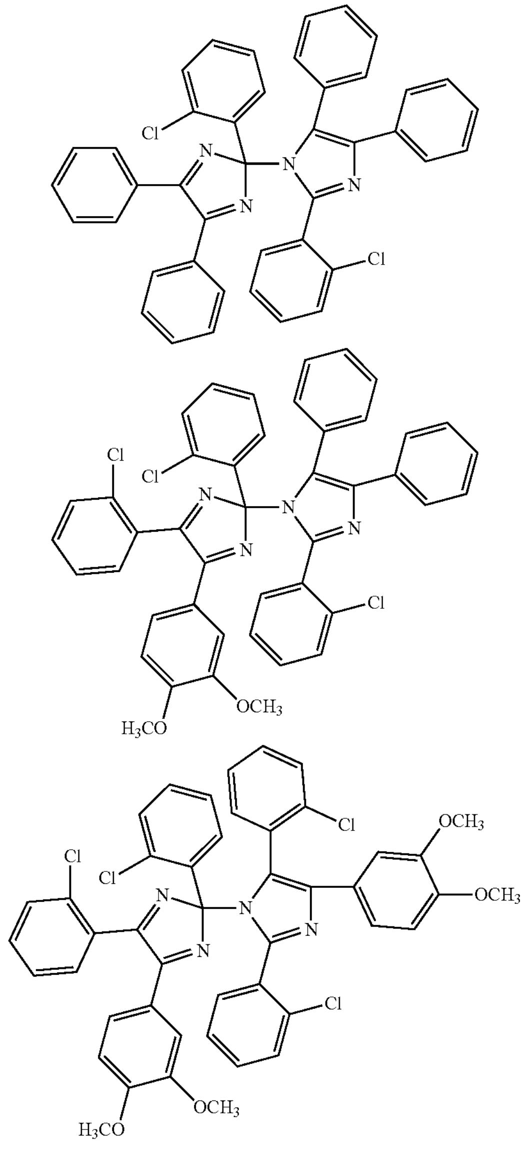

Examples of the triazine compound include 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-piperonyl-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine, and 2,4-bis(trichloromethyl)-6-[2-(3,4-dimethoxyphenyl)ethenyl]-1,3,5-triazine. Of these, 2,4-bis(trichloromethyl)-6-piperonyl-1,3,5-triazine is preferable.

Examples of the acylphosphine compound include bis(2,4,6-trimethylbenzoyl)phenylphosphine oxide and (2,4,6-trimethylbenzoyl)diphenylphosphine oxide.

The photopolymerization initiator described above may be used alone or in combination of two or more photopolymerization initiators. When two or more photopolymerization initiators are used in combination, a known polymerization initiator other than the oxime compound, biimidazole compound, triazine compound, and acylphosphine compound described above may be used in combination.

Examples of the known photopolymerization initiator include benzoin compounds such as benzoin, benzoin methyl ether, benzoin ethyl ether, benzoin isopropyl ether, and benzoin isobutyl ether; benzophenone compounds such as benzophenone, methyl o-benzoylbenzoate, 4-phenylbenzophenonne, 4-benzoyl-4'-methyldiphenyl sulfide, 3,3',4,4'-tetra(tert-butylperoxycarbonyl)benzophenone, 2,4,6-trimethylbenzophenone, and 4,4'-bis(diethylamino)benzophenone; quinone compounds such as 9,10-phenanthrene quinone, 2-ethylanthraquinone, and camphorquinone; and 10-butyl-2-chloroacridone, benzyl, methyl phenylglyoxylate, and a titanocene compound.

Example of the combination of two or more photopolymerization initiators include a combination of an oxime compound and a biimidazole compound, an oxime compound and a triazine compound, an oxime compound and an acylphosphine compound, a biimidazole compound and a triazine compound, a combination of a biimidazole compound and an acylphosphine compound, and a combination of a triazine compound and an acylphosphine compound.

[Photopolymerization Initiation Aid (D1)]

Further, if necessary, a photopolymerization initiation aid (D1) may be used in combination. The photopolymerization initiation aid (D1) is a compound or a sensitizer used to promote the polymerization of the photopolymerizable compound in which polymerization has been initiated by the photopolymerization initiator, and when the photopolymerization initiation aid (D1) is contained, it is usually used in combination with the photopolymerization initiator. Examples of the photopolymerization initiation aid (D1) include amine compounds, alkoxyanthracene compounds, thioxanthone compounds, and carboxylic acid compounds.

Examples of the amine compound include triethanolamine, methyldiethanolamine, triisopropanolamine, methyl 4-dimethylaminobenzoate, ethyl 4-dimethylaminobenzoate, isoamyl 4-dimethylaminobenzoate, 2-dimethylaminoethyl benzoate, 2-ethylhexyl 4-dimethylaminobenzoate, N,N-dimethylparatoluidine, 4,4'-bis(dimethylamino)benzophenone (common name: Michler's ketone), 4,4'-bis(diethylamino)benzophenone, and 4,4'-bis(ethylmethylamino)benzophenone, and of these, 4,4'-bis(diethylamino)benzophenone is preferable. Commercially available products such as EAB-F (manufactured by Hodogaya Chemical Co., Ltd.), may be used.

Examples of the alkoxy anthracene compound include 9,10-dimethoxyanthracene, 2-ethyl-9,10-dimethoxyanthracene, 9,10-diethoxyanthracene, 2-ethyl-9,10-diethoxyanthracene, 9,10-dibutoxyanthracene, and 2-ethyl-9,10-dibutoxyanthracene.

Examples of the thioxanthone compound include 2-isopropylthioxanthone, 4-isopropylthioxanthone, 2,4-diethylthioxanthone, 2,4-dichlorothioxanthone, and 1-chloro-4-propoxythioxanthone.

Examples of the carboxylic acid compound include phenylsulfanylacetic acid, methylphenylsulfanylacetic acid, ethylphenylsulfanylacetic acid, methylethylphenylsulfanylacetic acid, dimethylphenylsulfanylacetic acid, methoxyphenysulfanylacetic acid, dimethoxyphenylsulfanylacetic acid, chlorophenylsulfanylacetic acid, dichlorophenylsulfanylacetic acid, N-phenylglycine, phenoxyacetic acid, naphthylthioacetic acid, N-naphthylglycine, and naphthoxyacetic acid.

The content ratio of the photopolymerization initiator (D) is preferably 0.1 parts by mass or more and 300 parts by mass or less, and more preferably 0.1 parts by mass or more and 200 parts by mass or less, based on 100 parts by mass of the photopolymerizable compound (C). The content ratio of the photopolymerization initiator (D) is preferably 0.1 parts by mass or more and 30 parts by mass or less, and more preferably 1 part by mass or more and 20 parts by mass or less, based on 100 parts by mass of the total amount of the resin (D) and the photopolymerizable compound (C). When the content ratio of the photopolymerization initiator (D) is within the above range, the sensitivity tends to be increased and the exposure time tends to be shortened, so that the productivity of the cured film is improved.

Further, when the composition contains a photopolymerization initiation aid (D1), the content ratio of the photopolymerization initiation aid (D1) is preferably 0.1 parts by mass or more and 300 parts by mass or less, and more preferably 0.1 parts by mass or more and 200 parts by mass or less, based on 100 parts by mass of the photopolymerizable compound (C). The content ratio of the photopolymerization initiator (D) is preferably 0.1 parts by mass or more and 30 parts by mass or less, and more preferably 1 part by mass or more and 20 parts by mass or less, based on 100 parts by mass of the total amount of the resin (D) and the photopolymerizable compound (C). When the amount of the photopolymerization initiation aid (D1) is within this range, a cured film tends to be formed with higher sensitivity.

[5] Antioxidant (E)

The antioxidant (E) is not particularly limited as long as it is an antioxidant that is generally used industrially, and a phenol-based antioxidant, a phosphorus-based antioxidant, a phosphorus/phenol composite antioxidant, a sulfur-based antioxidant, and the like can be used. Two or more kinds of the antioxidants (E) may be used in combination. The phosphorus/phenol composite antioxidant may be a compound having one or more phosphorus atoms and one or more phenol structures in its molecule. Of these, a phosphorus/phenol composite antioxidant is preferable from the viewpoint of developability and emission intensity.

Examples of the phenol-based antioxidant include Irganox (R) 1010 (Irganox 1010: pentaerythritol tetrakis[3-(3,5-di-t-butyl-4-hydroxyphenyl)propionate], manufactured by BASF Japan Ltd.), Irganox 1076 (Irganox 1076: Octadecyl-3-(3,5-di-t-butyl-4-hydroxyphenyl)propionate, manufactured by BASF Japan Ltd.), Irganox 1330 (Irganox 1330: 3,3',3",5,5',5"-hexa-t-butyl-a,a',a"-(mesitylene-2,4,6-triyl)tri-p-cresol, BASF Japan Ltd.), Irganox 3114 (Irganox 3114: 1,3,5-tris(3,5-di-t-butyl-4-hydroxybenzyl)-1,3,5-triazine-2, 4,6(1H,3H,5H)-trione, BASF Japan Ltd.), Irganox 3790 (Irganox 3790: 1,3,5-tris((4-t-butyl-3-hydroxy-2,6-xylyl) methyl)-1,3,5-triazine-2,4,6(1H,3H,5H)-trione, BASF Japan Ltd.), Irganox 1035 (Irganox 1035: thiodiethylenebis [3-(3,5-di-tert-butyl-4 hydroxyphenyl)propionate], manufactured by BASF Japan Ltd.), Irganox 1135 (Irganox 1135: benzene propanoic acid, 3,5-bis(1,1-dimethylethyl)-4-hydroxy, C7-C9 side-chain alkyl ester, manufactured by BASF Japan Ltd.), Irganox 1520 L (Irganox 1520 L: 4,6-bis (octylthiomethyl)-o-cresol, manufactured by BASF Japan Ltd.), Irganox 3125 (Irganox 3125, BASF Japan Ltd.), Irganox 565 (Irganox 565: 2,4-bis(n-octylthio)-6-(4-hydroxy-3',5'-di-t-butylanilino)-1,3,5-triazine, manufactured by BASF Japan Ltd.), ADK STAB (R) A0-80 (ADK STAB A0-80: 3,9-bis(2-(3-(3-t-butyl-4-hydroxy-5-methylphenyl) propionyloxy)-1,1-dimethylethyl)-2,4,8,10-tetraoxaspiro(5, 5)undecane, manufactured by ADEKA Corporation), SUMILIZER (R) BHT, SUMILIZER GA-80, SUMILIZER GS (manufactured by Sumitomo Chemical Co., Ltd.), Cyanox (R) 1790 (Cyanox 1790, manufactured by Cytec Industries Inc.), and vitamin E (manufactured by Eisai Co., Ltd.).

Examples of the phosphorus-based antioxidant include Irgafos (R) 168 (Irgafos 168: tris(2,4-di-t-butylphenyl)phosphite, manufactured by BASF Japan Ltd.), Irgafo12 (Irgafos 12: tris[2-[[2,4,8,10-tetra-t-butyldibenzo[d,f][1,3,2]-dioxaphosphine-6-yl]oxy]ethyl]amine, manufactured by BASF Japan Ltd.), Irgafos 38 (Irgafos 38: bis(2,4-bis(1,1-dimethylethyl)-6-methylphenyl)ethyl ester phosphite, BASF Japan Ltd.), ADK STAB (R) 329K, Irgafos PEP36, Irgafos PEP-8 (all manufactured by ADEKA Corporation), Sandstab P-EPQ (manufactured by Clariant AG), Weston (R) 618, Weston 619G (manufactured by GE), and Ultranox 626 (manufactured by GE).

Examples of the phosphorus/phenol composite antioxidant include SUMILIZER (R) GP (6-[3-(3-t-butyl-4-hydroxy-5-methylphenyl)propoxy]-2,4,8,10-tetra-t-butyldibenz[d,f][1.3.2]dioxaphosphepine) (manufactured by Sumitomo Chemical Co., Ltd.).

Examples of the sulfur-based antioxidant include dialkyl thiodipropionate compounds such as dilauryl thiodipropionate, dimyristyl thiodipropionate, and distearate thiodipropionate; and β-alkylmercaptopropionic acid ester compounds of polyols such as tetrakis[methylene(3-dodecylthio) propionate]methane.

The content ratio of the antioxidant (E) may be, for example, based on 100 parts by mass of the resin (B), 1 part by mass or more and 50 parts by mass or less and is preferably 5 parts by mass or more and 40 parts by mass or less, more preferably 7 parts by mass or more and 30 parts by mass or less, and still more preferably 11 parts by mass or more and 25 parts by mass or less from the viewpoint of the light emission amount and heat resistance.

[6] Leveling Agent (F)

Examples of the leveling agent (F) include a silicone-based surfactant, a fluorine-based surfactant, and a silicone-based surfactant having a fluorine atom. These may have a polymerizable group at its side chain. The leveling agent (F) is preferably a fluorine-based surfactant from the viewpoint of developability and emission intensity.

Examples of the silicone-based surfactant include a surfactant having a siloxane bond in its molecule. Specific examples thereof include Toray Silicone DC3PA, Toray Silicone SH7PA, Toray Silicone DC11PA, Toray Silicone SH21PA, Toray Silicone SH28PA, Toray Silicone SH29PA, Toray Silicone SH30PA, and Toray Silicone SH8400 (trade name: manufactured by Dow Corning Toray Co., Ltd.); KP321, KP322, KP323, KP324, KP326, KP340, and KP341 (manufactured by Shin-Etsu Chemical Co., Ltd.); and TSF400, TSF401, TSF410, TSF4300, TSF4440, TSF4445, TSF-4446, TSF4452, and TSF4460 (manufactured by Momentive Performance Materials Inc.).

Examples of the fluorine-based surfactant include a surfactant having a fluorocarbon chain in its molecule. Specific examples thereof include Fluorad (R) FC430 and Fluorad FC431 (manufactured by Sumitomo 3M Limited); MEGAFACE (R) F142D, MEGAFACE F171, MEGAFACE F172, MEGAFACE F173, MEGAFACE F177, MEGAFACE F183, MEGAFACE F554, MEGAFACE F575, MEGAFACE R30, and MEGAFACE RS-718-K (manufactured by DIC Corporation); EFTOP (R) EF301, EFTOP EF303, EFTOP EF351, and EFTOP EF352 (manufactured by Mitsubishi Materials Electronic Chemicals Co., Ltd.); Surflon (R) 5381, Surflon 5382, Surflon SC101, and Surflon SC105 (manufactured by Asahi Glass Co., Ltd.); and E5844 (manufactured by Daikin Fine Chemical Laboratory).

Examples of the silicone-based surfactant having a fluorine atom include a surfactant having a siloxane bond and a fluorocarbon chain in its molecule. Specific examples thereof include MEGAFACE (R) R08, MEGAFACE BL20, MEGAFACE F475, MEGAFACE F477, and MEGAFACE F443 (manufactured by DIC Corporation).

The content ratio of the leveling agent (F) may be, for example, based on the total amount of the composition, 0.001% by mass or more and 1.0% by mass or less, preferably 5% by mass or more and 0.75% by mass or less, more preferably 0.01% by mass or more and 0.5% by mass or less, and still more preferably 0.05% by mass or more and 0.5% by mass or less. When the content ratio of the leveling agent (F) is within the above range, the flatness of the cured film can be further improved.

[7] Solvent (G)

The solvent (G) is not particularly limited as long as it dissolves the resin (B), the photopolymerizable compound (C), and the photopolymerization initiator (D), and any solvent which has been used conventionally in the art can be used. Examples of the solvent (G) include an ester solvent (a solvent which contains —COO— but does not contain —O— in its molecule), an ether solvent (a solvent which contains —O— but does not contain —COO— in its molecule), an ether ester solvent (a solvent which contains —COO— and —O— in its molecule), a ketone solvent (a solvent which contains —CO— but does not contain —COO— in its molecule), an alcohol solvent (a solvent which contains OH but does not contain —O—, —CO— nor —COO— in its molecule), an aromatic hydrocarbon solvent, an amide solvent, and dimethyl sulfoxide.

Examples of the ester solvent include methyl lactate, ethyl lactate, n-butyllactate, methyl 2-hydroxy isobutanoate, ethyl acetate, n-butylacetate, isobutylacetate, n-pentyl formate, isopentyl acetate, n-butylpropionate, isopropyl butyrate, ethyl butyrate, n-butylbutyrate, methyl pyruvate, ethyl pyruvate, propyl pyruvate, methyl acetoacetate, ethyl acetoacetate, cyclohexanol acetate, and γ-butyrolactone.

Examples of the ether solvent include ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monopropyl ether, propylene glycol monobutyl ether, 3-methoxy-1-butanol, 3-methoxy-3-methylbutanol, tetrahydrofuran, tetrahydropyran, 1,4-dioxane, diethylene glycol dimethyl ether, diethylene glycol diethyl ether, diethylene glycol methyl ethyl ether, diethylene glycol dipropyl ether, diethylene glycol dibutyl ether, anisole, phenetol, and methyl anisole.

Examples of the ether ester solvent include methyl methoxyacetate, ethyl methoxyacetate, butyl methoxyacetate, methyl ethoxyacetate, ethyl ethoxyacetate, methyl 3-methoxypropionate, ethyl 3-methoxypropionate, methyl 3-ethoxypropionate, ethyl 3-ethoxypropionate, methyl 2-methoxypropionate, ethyl 2-methoxypropionate, propyl 2-methoxypropionate, methyl 2-ethoxy propionate, ethyl 2-ethoxypropionate, methyl 2-methoxy-2-methylpropionate, ethyl 2-ethoxy-2-methylpropionate, 3-butyl methoxyacetate, 3-methyl-3-butyl methoxyacetate, propylene glycol monomethyl ether acetate, propylene glycol monoethyl ether acetate, propylene glycol monopropyl ether acetate, ethylene glycol monomethyl ether acetate, ethylene glycol monoethyl ether acetate, diethylene glycol monoethyl ether acetate, and diethylene glycol monobutyl ether acetate.

Examples of the ketone solvent include 4-hydroxy-4-methyl-2-pentanone, acetone, 2-butanone, 2-heptanone, 3-heptanone, 4-heptanone, 4-methyl-2-pentanone, cyclopentanone, cyclohexanone, and isophorone.

Examples of the alcohol solvent include methanol, ethanol, propanol, butanol, hexanol, cyclohexanol, ethylene glycol, propylene glycol, and glycerin.

Examples of the aromatic hydrocarbon solvent include benzene, toluene, xylene, and mesitylene.

Examples of the amide solvent include N,N-dimethylformamide, N,N-dimethylacetamide, and N-methylpyrrolidone.

The solvent is preferably propylene glycol monomethyl ether acetate, ethyl lactate, propylene glycol monomethyl ether, ethyl 3-ethoxypropionate, ethylene glycol monomethyl ether, diethylene glycol monomethyl ether, diethylene glycol monoethyl ether, 4-hydroxy-4-methyl-2-pentanone, or toluene.

The solvent (G) is a component other than the solid content, and is a component also containing a solvent contained in, for example, the quantum dots (A), the resin (B), and the like. The content ratio of the solvent (G) is the ratio of the total mass of all the solvents contained in the composition to the total amount of the composition, and may be, for example, based on the total amount of the composition, 40% by mass or more and 95% by mass or less, preferably 50% by mass or more and 90% by mass or less. In other words, the solid content of the composition is preferably 5% by mass or more and 60% by mass or less, and more preferably 10% by mass or more and 50% by mass or less. When the content of the solvent (G) is within the above range, there is a tendency that the flatness of the composition layer at the time of coating becomes better and a cured film having an appropriate film thickness is easily formed.

[8] Light Scattering Agent (H)

The composition of the present invention may further contain a light scattering agent (H). Examples of the light scattering agent (H) include particles of metal or metal oxide, and glass particles. Examples of the metal oxide include $TiO_2$, $SiO_2$, $BaTiO_3$, and ZnO. The particle size of the light scattering agent (H) is, for example, 0.03 μm or more and 20 μm or less, preferably 0.05 μm or more and 1 μm or less, and still more preferably 0.05 or more and 0.5 μm or less.

The content ratio of the light scattering agent (H) in the composition may be, for example, based on the total amount of the solid content of the composition, 0.001% by mass or more and 50% by mass or less, and from the viewpoint of developability and emission intensity of the cured film, preferably 1% by mass or more and 30% by mass or less, and more preferably 2% by mass or more and 10% by mass or less. When the curable composition contains an organic solvent, the light scattering agent (H) may be dispersed in advance in a part of the organic solvent (G) using a dispersant (J) and used. For example, commercially available products may also be used as the dispersant (J).

Examples of the commercially available products include:

DISPERBYK-101, 102, 103, 106, 107, 108, 109, 110, 111, 116, 118, 130, 140, 154, 161, 162, 163, 164, 165, 166, 170, 171, 174, 180, 181, 182, 183, 184, 185, 190, 192, 2000, 2001, 2020, 2025, 2050, 2070, 2095, 2150, 2155; ANTI-TERRA-U, U100, 203, 204, 250; BYK-P104, P104S, P105, 220S, 6919; BYK-LPN6919, and 21116; LACTIMON and LACTIMON-WS; Bykumen; and the like, manufactured by BYK Japan KK;

SOLSPERSE-3000, 9000, 13000, 13240, 13650, 13940, 16000, 17000, 18000, 20000, 21000, 24000, 26000, 27000, 28000, 31845, 32000, 32500, 32550, 33500, 32600, 34750, 35100, 36600, 38500, 41000, 41090, 53095, 55000, 76500, and the like, manufactured by Lubrizol Japan Limited;

EFKA-46, 47, 48, 452, 4008, 4009, 4010, 4015, 4020, 4047, 4050, 4055, 4060, 4080, 4400, 4401, 4402, 4403, 4406, 4408, 4300, 4310, 4320, 4330, 4340, 450, 451, 453, 4540, 4550, 4560, 4800, 5010, 5065, 5066, 5070, 7500, 7554, 1101, 120, 150, 1501, 1502, 1503, and the like, manufactured by BASF Japan Ltd.; and AJISPER PA111, PB711, PB821, PB822, and PB824, manufactured by Ajinomoto Fine-Techno Co., Inc.

If necessary, the composition of the present invention may further contain an additive known in the art, such as a polymerization inhibitor, a filler, other polymeric compound, an adhesion promoter, a light stabilizer, or a chain transfer agent.

<Method for Producing Composition>

The method for producing the composition may include a step of mixing the quantum dots (A), the resin (B), the polymerizable compound (C), the photopolymerization initiator (D), the antioxidant (E), the leveling agent (F), and the solvent (G), and other components used as necessary.

<Cured Film>

The cured film of the present invention can be obtained by applying the composition of the present invention to a substrate and curing by the action of light or heat. The cured film of the present invention may be formed on the entire surface of the substrate or may be formed on a part of the substrate (that is, a cured pattern). Examples of the method for forming a cured film on a part of the substrate include a photolithography method, an inkjet method, and a printing method. Of these, the photolithography method is preferable. The photolithography method is a method in which a composition of the present invention is applied to a substrate, dried as necessary to form a composition layer, and the composition layer is exposed to light through a photomask and developed.

Examples of a method for forming a cured film on the entire surface of a substrate include a method in which a composition of the present invention is applied to a substrate, dried as necessary to form a composition layer, and the composition layer is heated and/or the entire surface of the composition layer is exposed to light.

Examples of the substrate include a glass plate made from, for example, quartz glass, borosilicate glass, alumina silicate glass, soda lime glass of which the surface is coated with silica, or the like; a resin plate made from, for example, polycarbonate, polymethyl methacrylate, polyethylene terephthalate or the like; a substrate made from silicon; and a substrate produced by forming a thin film made from aluminum, silver or a silver/copper/palladium alloy or the like on a substrate.

The formation of a cured pattern using a photolithography method can be carried out using a known or conventional device or under known or conventional conditions. For example, it can be produced as follows.

First, the curable composition is applied onto a substrate, and then dried by heat-drying (prebaking) and/or drying under reduced pressure to remove volatile components including a solvent from the composition, thereby producing a composition layer. Examples of the coating method include a spin coating method, a slit coating method, and a slit and spin coating method.

The temperature to be employed in the case where heat-drying is carried out is preferably 30° C. to 120° C., more preferably 50° C. to 110° C. The heating time is preferably 10 seconds to 60 minutes, and more preferably 30 seconds to 30 minutes.

In the case where drying under reduced pressure is carried out, it is preferred to carry out the drying procedure under a pressure of 50 Pa to 150 Pa and at a temperature of 20° C. to 25° C.

The film thickness of the composition layer is not particularly limited, and may be selected appropriately depending on the desired film thickness of the cured pattern to be produced, and may be, for example, 0.5 μm or more and 20 μm or less, preferably 3 μm or more and 18 μm or less, and more preferably 5 μm or more and 16 μm or less.

Next, the composition layer is exposed to light through a photomask for forming a desired cured pattern. The pattern on the photomask is not particularly limited.

The light sources used for exposure are preferably a light source that emits light having a wavelength of 250 nm to 450 nm. For example, light in the vicinity of 436 nm, 408 nm, or 365 nm may be selectively extracted from the light having the wavelength according to the absorption wavelength of the polymerization initiator by a band-pass filter. Specific examples of the light source include a mercury lamp, a light-emitting diode, a metal halide lamp, and a halogen lamp.

A light-exposing device such as a mask aligner and a stepper is preferably used because the device is capable of irradiating a parallel light beam uniformly over the whole area of the exposed surface or aligning the photomask accurately to the substrate which has the composition layer formed thereon. The exposed composition layer is cured by polymerizing the polymerizable compound and the like contained in the composition layer.

By bringing the exposed composition layer into contact with a developing solution for development, the unexposed portion of the composition layer is dissolved and removed in the developer to obtain a cured pattern. Examples of the developer include an aqueous solution of an alkaline compound such as potassium hydroxide, sodium hydrogen carbonate, sodium carbonate and tetramethylammonium hydroxide; and organic solvents. The concentration of the alkaline compound in the aqueous solution is preferably 0.01% by mass or more and 10% by mass or less, and more preferably 0.03% by mass or more and 5% by mass or less. Examples of the organic solvent include the same as the solvent (G). Further, the developer may contain a surfactant.

The developing method may be any of a paddle method, a dipping method, a spray method and the like. Further, the substrate may be inclined at any degree during development.

The cured pattern obtained by development is preferably further subjected to heating (post-baking). The heating temperature is carried out is preferably 150° C. to 250° C., more preferably 160° C. to 235° C. The heating time is preferably 1 minute to 120 minutes, and more preferably 10 minutes to 60 minutes. By performing heating after development, polymerization of the unreacted polymerizable compound and the like contained in the cured pattern can be advanced, and therefore, a cured pattern having more excellent chemical resistance can be obtained.

By irradiating the cured film of the present invention with ultraviolet light or visible light, the cured film of the present invention can emit light having a wavelength different from that of the irradiation light. The wavelength of light to be emitted can be selected by selecting the components and the particle size of the quantum dots in the composition used for forming the cured film of the present invention.

Since the cured film of the present invention has a function of converting the wavelength of irradiation light as described above, it can be used as a color conversion layer of a display device. Examples of such a display device include display devices disclosed in Japanese Patent Laid-Open No. 2006-309219, Japanese Patent Laid-Open No. 2006-310303, Japanese Patent Laid-Open No. 2013-15812, Japanese Patent Laid-Open No. 2009-251129, and Japanese Patent Laid-Open No. 2014-2363.

The composition of the present invention is useful as a color conversion layer for a display device, especially a liquid crystal display device, because there is a tendency that a film having a high development speed and a high emission intensity can be obtained even in a thick film.

<Resin>

Another subject matter of the present invention is a resin having a sulfide group, a carboxy group, and an unsaturated double bond (hereinafter, also referred to as resin (I)). The resin (I) may be the polymer (B1) described above. The description in the polymer (B1) described above is applied to the monomer, the structural unit, the proportion of the structural unit, the weight-average molecular weight, the acid value, the acrylic equivalent, the modification amount per molecular chain, and the production method of the resin (I).

EXAMPLES

Hereinafter, the present invention will be described in more detail by way of examples. Unless otherwise specified, "%" and "part" in the example are % by mass and parts by mass.

[Measurement of Emission Intensity]

Onto a 5-cm square glass substrate (Eagle 2000; manufactured by Corning Incorporated), a curable composition (X) was applied by a spin coat method so that the film thickness set to 10 μm, and then prebaked at 100° C. for 3 minutes, to form a curable composition layer. This curable composition layer was subjected to light irradiation in an exposure amount (basis: 365 nm) of 500 $mJ/cm^2$ under an air atmosphere using an exposure device (TME-150RSK; manufactured by TOPCON CORPORATION) and after development, post-baking was performed 180° C. for 60 minutes, to obtain a substrate having a cured film.

The emission intensity in the wavelength region longer than 485 nm was measured using a spectrometer (Ocean Optics, Inc).

[Evaluation of Solvent Resistance]

The sample used for the measurement of the emission intensity was immersed in an organic solvent (PGMEA) for 30 minutes, and then the emission intensity was measured in accordance with the procedure of the measurement of the emission intensity. The proportion of the emission intensity after immersion based on the emission intensity before immersion in the organic solvent was determined.

[Evaluation of Development Residue]

Onto a 5-cm square glass substrate (Eagle 2000; manufactured by Corning Incorporated), a composition was applied by a spin coat method so that the film thickness was set to 10 μm, and then prebaked at 100° C. for 3 minutes to form a composition layer, and then developed by immersion in a developer (0.05% aqueous solution of potassium hydroxide). The surface of the developed glass substrate was observed by reflected light of a fluorescent lamp to evaluate the presence or absence of residues in the composition layer.

[Weight-Average Molecular Weight]

The weight-average molecular weight (Mw) of the resin was measured by the GPC method under the following conditions.

Equipment: K2479 (manufactured by Shimadzu Corporation)
Column: SHIMADZU Shim-pack GPC-80M
Column temperature: 40° C.
Solvent: tetrahydrofuran
Flow rate: 1.0 mL/min
Detector: RI
Standard for calibration; TSK STANDARD POLYSTYRENE F-40, F-4, F-288, A-2500, A-500 (manufactured by Tosoh Corporation)

[Acid Value]

Three grams of the resin solution was precisely weighed, dissolved in a mixed solvent of 90 g of acetone and 10 g of water, and the acid value of the polymer solution was measured by an automatic titrator (manufactured by HIRANUMA Co., Ltd., trade name: COM-555) using the KOH aqueous solution specified in 0.1 as the titrant, and the acid value (AV) per 1 g of solid content was determined from the acid value of the solution and the solid content of the solution.

[Solid Content]

About 1 g of the polymer solution was weighed in an aluminum cup, dried at 180° C. for 1 hour, and then the mass was measured. The solid content (% by mass) of the polymer solution was calculated from the mass reduction amount.

Production Example 1: Scattering Agent (H-1)

To 70 parts by mass of titanium oxide nanoparticles, 3 parts by mass of DISPERBYK21116 (manufactured by BYK Japan KK) as a solid content was added and PGMEA was added so that the total amount was 100 parts by mass, and the mixture was stirred with a paint shaker until it was sufficiently dispersed to obtain a dispersion (solid content: 73%) of a scattering agent (H-1).

Example 1: Resin (B-1)

After 110 parts by mass of propylene glycol monomethyl ether acetate (hereinafter referred to as "PGMEA") were put into a flask equipped with a stirrer, a reflux cooling tube with a thermometer, a dropping funnel, and a nitrogen introduction tube, the mixture was stirred while replacing nitrogen, and the temperature was raised to 80° C. A solution obtained by dissolving 10 parts by mass of dicyclopentanyl methacrylate, 45 parts by mass of benzyl methacrylate, 45 parts by mass of methacrylic acid, and 7 parts by mass of 2,2'-azobis(2.4-dimethylvaleronitrile) in 110 parts by mass of PGMEA was dropped from a dropping funnel into a flask, and stirred at 80° C. for 3 hours.

Next, 15 parts by mass of glycidyl methacrylate, 0.4 parts by mass of 2,2'-methylenebis(4-methyl-6-t-butylphenol), and 0.8 parts by mass of triethylamine were put into a flask, and the mixture was heated to 110° C., stirred for 8 hours, and then cooled to room temperature to obtain a resin solution. To 100 parts by mass of this resin solution, 0.4 parts by mass of mercaptopropionic acid was added, and the mixture was stirred at 80° C. for 4 hours to obtain a resin (B-1) solution. The solid content in the resin (B-1) solution was 40% by mass. The weight-average molecular weight, acid value, acrylic equivalent, and modification amount of the resin (B-1) are shown in Table 3.

Example 2: Resin (B-2)

A resin (B-2) solution was obtained in the same manner as in Example 1 except that 0.8 parts by mass of mercaptopropionic acid was added instead of 0.4 parts by mass of mercaptopropionic acid in Example 1. The results are shown in Table 3.

Example 3: Resin (B-3)

A resin (B-3) solution was obtained in the same manner as in Example 1 except that 0.6 parts by mass of mercaptosuccinic acid was added instead of 0.4 parts by mass of mercaptopropionic acid in Example 1. The results are shown in Table 3.

Example 4: Resin (B-4)

After 110 parts by mass of propylene glycol monomethyl ether acetate (hereinafter referred to as "PGMEA") were put into a flask equipped with a stirrer, a reflux cooling tube with a thermometer, a dropping funnel, and a nitrogen introduction tube, the mixture was stirred while replacing nitrogen, and the temperature was raised to 80° C. A solution obtained by dissolving 10 parts by mass of dicyclopentanyl methacrylate, 45 parts by mass of benzyl methacrylate, 45 parts by mass of methacrylic acid, and 12.5 parts by mass of 2,2'-azobis(2.4-dimethylvaleronitrile) in 110 parts by mass of PGMEA was dropped from a dropping funnel into a flask, and stirred at 80° C. for 3 hours.

Next, 15 parts by mass of glycidyl methacrylate, 0.4 parts by mass of 2,2'-methylenebis(4-methyl-6-t-butylphenol), and 0.8 parts by mass of triethylamine were put into a flask, and the mixture was heated to 110° C., stirred for 8 hours, and then cooled to room temperature to obtain a resin solution having a solid content of 40%.

To 100 parts by mass of this resin solution, 0.5 parts by mass of mercaptopropionic acid was added, and the mixture was stirred at 80° C. for 4 hours to obtain a resin (B-4) solution. The results are shown in Table 3.

Comparative Example 1: Resin (B-5)

A resin (B-5) solution was obtained in the same manner as in Example 1 except that mercaptopropionic acid was not added in Example 1. The results are shown in Table 3.

TABLE 3

| Resin | Example 1 (B-1) | Example 2 (B-2) | Example 3 (B-3) | Example 4 (B-4) | Comparative Example 1 (B-5) |
|---|---|---|---|---|---|
| Weight-average molecular weight Mw | 10300 | 10400 | 10400 | 6700 | 10200 |
| Acid value [mg KOH/g] | 104 | 109 | 109 | 105 | 100 |
| Acrylic equivalent [g/eq] | 1330 | 1530 | 1340 | 1420 | 1170 |
| Modification amount calculated from charging ratio | 1.0 | 2.0 | 1.0 | 0.75 | 0 |

Examples 5 to 8, Comparative Example 2

Each component in Table 4 was mixed to prepare compositions of Examples and Comparative Examples. The emission intensity, solvent resistance, and developability of the obtained composition were evaluated. The results are shown in Table 5.

TABLE 4

| | | Example | | | | Comparative Example |
|---|---|---|---|---|---|---|
| | | 5 | 6 | 7 | 8 | 2 |
| Quantum dots (A) | A-1 | 20 | 20 | 20 | 20 | 20 |
| Resin (B) | B-1 | 51.5 | — | — | — | |
| | B-2 | | 51.5 | — | — | — |
| | B-3 | — | — | 51.5 | — | — |
| | B-4 | — | — | — | 51.5 | — |
| | B-5 | — | — | — | — | 51.5 |
| Photopolymerizable compound (C) | C-1 | 17.2 | 17.2 | 17.2 | 17.2 | 17.2 |
| Photopolymerization initiator (D) | D-1 | 2.1 | 2.1 | 2.1 | 2.1 | 2.1 |
| Antioxidant (E) | E-1 | 4.1 | 4.1 | 4.1 | 4.1 | 4.1 |
| Leveling agent (F) | F-1 | 0.1 | 0.1 | 0.1 | 0.1 | 0.1 |
| Solvent (G) | G-1 | 233 | 233 | 233 | 233 | 233 |
| Scattering agent (H) | H-1 | 5 | 5 | 5 | 5 | 5 |

Unit: % by mass (the solid content of the resin composition is set to 100%)
(the values of the quantum dots (A), the scattering agent (B), and the resin (C) do not include the solvent)

TABLE 5

| | Example | | | | Comparative Example |
|---|---|---|---|---|---|
| | 5 | 6 | 7 | 8 | 2 |
| Emission intensity | 113 | 177 | 155 | 184 | 100 |
| Emission retention rate (solvent resistance) | 91% | 92% | 99% | 99% | 89% |
| Development residue | Absent | Absent | Absent | Absent | Present |

The invention claimed is:

1. A composition comprising: quantum dots (A); and a resin (B), wherein the resin (B) comprises a polymer (B1) having a sulfide group, a carboxy group, and an unsaturated double bond, and a weight-average molecular weight of the polymer (B1) is 4000 or more and 20000 or less.

2. The composition according to claim 1, wherein the polymer (B1) is a polymer having a structural unit derived from a monomer (a) having a mercapto group and a carboxy group, a monomer (b) which is at least one selected from the group consisting of an unsaturated carboxylic acid and an unsaturated carboxylic acid anhydride, and a monomer (c) having an oxiranyl group and an ethylenically unsaturated bond.

Ligand-containing quantum dots (A-1): Toluene dispersion of InP/ZnSeS quantum dots coordinated with oleic acid (solid content: 10%)

Photopolymerizable compound (C-1): M-510 (polybasic modified acrylate, manufactured by Toagosei Co., Ltd.)

Photopolymerization initiator (D-1): OXE02 (Oxime Initiator, manufactured by BASF Japan Ltd.)

Antioxidant (E-1): SUMILIZER-GP (phosphorus/phenol composite, antioxidant, manufactured by Sumitomo Chemical Co., Ltd.)

Leveling agent (F-1): Toray Silicone SH8400 (silicone-based leveling agent, manufactured by Dow Corning Toray Co., Ltd.)

Solvent (G-1): PGMEA (propylene glycol monomethyl ether acetate)

3. The composition according to claim 2, wherein the monomer (a) having a mercapto group and a carboxy group comprises a compound represented by the general formula (1)

[Formula 1]

(1)

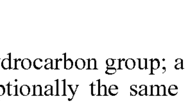

wherein

R represents a hydrocarbon group; a plurality of R, when present, are optionally the same as or different from each other; the hydrocarbon group optionally has one or more substituents; a plurality of substituents, when present, are optionally the same or different, and are optionally bonded to each other to form a ring together with the atoms to which they are bonded;- $-CH_2-$ contained in the hydrocarbon group is optionally replaced by at least one of —O—, —CO—, and —NH—; and p represents an integer of 1 to 10.

4. The composition according to claim 2, wherein the monomer (c) having an oxiranyl group and an ethylenically unsaturated bond comprises at least one of a monomer (c1) having a structure obtained by epoxidizing an unsaturated chain aliphatic hydrocarbon and an ethylenically unsaturated bond and a monomer (c2) having a structure obtained by epoxidizing an unsaturated alicyclic hydrocarbon and an ethylenically unsaturated bond.

5. The composition according to claim 1, wherein the polymer (B1) has a structural unit represented by the general formulas (ba), (bb), and (bc):

[Formula 2]

(ba)

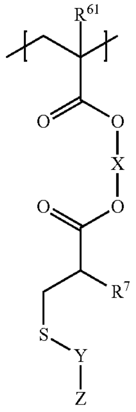

(bb)

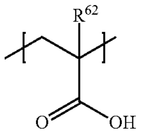

-continued (bc)

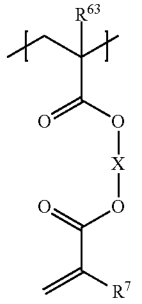

wherein $R^{61}$, $R^{62}$, and $R^{63}$ each independently represent a hydrogen atom or a methyl group;

$R^7$ represents a hydrogen atom or an alkyl group having 1 to 4 carbon atoms, and a hydrogen atom contained in the alkyl group is optionally replaced by a hydroxy group;

X represents $*-R^8-X^3-$, $*-R^8-O-X^3-$, $*-R^8-S-X^3-$, or $*-R^8-NH-X^3-$; * represents a bond to an oxygen atom on a $R^7$ side; $R^8$ represents an alkanediyl group having 1 to 6 carbon atoms; $X^3$ represents an ethylene group or a divalent alicyclic hydrocarbon group, which has a hydroxy group;

Y represents $-(R)_p-$; R represents a hydrocarbon group; a plurality of R, when present, are optionally the same as or different from each other; the hydrocarbon group optionally has one or more substituents; a plurality of substituents, when present, are optionally the same or different, and are optionally bonded to each other to form a ring together with the atoms to which they are bonded; $-CH_2-$ contained in the hydrocarbon group is optionally replaced by at least one of —O—, —CO—, and —NH—;  represents a bond to S; p represents an integer of 1 to 10; and Z represents a carboxy group.

6. The composition according to claim 1, further comprising a polymerizable compound (C) and a polymerization initiator (D).

7. A cured film formed from the composition according to claim 1.

8. A display device comprising the cured film according to claim 7.

* * * * *